(12) United States Patent
Huang et al.

(10) Patent No.: US 10,549,255 B2
(45) Date of Patent: Feb. 4, 2020

(54) FUNCTIONALIZED CHROMATOGRAPHIC MATERIALS AND METHODS OF MAKING AND USING THEREFOR

(71) Applicant: Brown University, Providence, RI (US)

(72) Inventors: Yongsong Huang, Barrington, RI (US); Jose C. Aponte, Silver Spring, MD (US); Rafael Tarozo, Providence, RI (US); James Dillon, Pawtucket, RI (US)

(73) Assignee: BROWN UNIVERSITY, Providence, RI (US)

( * ) Notice: Subject to any disclaimer, the term of this patent is extended or adjusted under 35 U.S.C. 154(b) by 883 days.

(21) Appl. No.: 13/760,497

(22) Filed: Feb. 6, 2013

(65) Prior Publication Data

US 2013/0146542 A1  Jun. 13, 2013

Related U.S. Application Data

(63) Continuation of application No. PCT/US2011/046810, filed on Aug. 5, 2011.
(Continued)

(51) Int. Cl.
*B01J 20/02* (2006.01)
*B01J 20/32* (2006.01)
(Continued)

(52) U.S. Cl.
CPC .......... *B01J 20/0262* (2013.01); *B01D 15/38* (2013.01); *B01J 20/0233* (2013.01);
(Continued)

(58) Field of Classification Search
CPC .. B01J 20/0203; B01J 20/0233; B01J 20/024; B01J 20/0225; B01J 20/223; B01J 20/10;
(Continued)

(56) References Cited

U.S. PATENT DOCUMENTS 4,432,877 A  2/1984  Tzodikov
5,149,646 A  9/1992  Crane et al.
(Continued)

FOREIGN PATENT DOCUMENTS

JP  H10 287506 A1  10/1998
WO  2010026402 A1  3/2010
WO  2010026403 A1  3/2010

OTHER PUBLICATIONS

Spennato et al. Silver thiolato complexes grafted on silica and dissolved in organic solution. Transition Metal Chemistry, 29: 830-839, 2004.*
(Continued)

*Primary Examiner* — Katherine Zalasky McDonald
(74) *Attorney, Agent, or Firm* — Adler Pollock & Sheehan P.C.

(57) ABSTRACT

Methods, compositions, devices and kits having a novel chromatographic material are provided herein for separating and identifying organic molecules and compounds, for example molecules and compounds containing electron rich functional groups such as carbon-carbon double bonds. The methods, compositions, and kits include a metal-thiolate chromatographic medium (MTCM) with a sulfur-containing functional group or a metal-selenolate chromatographic medium (MSCM) comprising a selenium-containing functional group covalently attached to a support medium, such that the sulfur-containing functional group or selenium-containing functional group is bound to at least one metal atom. The MTCM and/or MSCM has affinity and specificity to compounds having one or more carbon-carbon double bonds, and performs a highly efficient and rapid separation of samples yielding non-overlapping peaks of purified materials compared to traditional media.

3 Claims, 25 Drawing Sheets

Related U.S. Application Data

(60) Provisional application No. 61/371,207, filed on Aug. 6, 2010.

(51) Int. Cl.
   *B01D 15/38* (2006.01)
   *B01D 15/10* (2006.01)
   *B01J 20/285* (2006.01)
   *B01J 20/284* (2006.01)
   *B01J 20/283* (2006.01)
   *B01J 20/287* (2006.01)

(52) U.S. Cl.
   CPC ........... *B01J 20/283* (2013.01); *B01J 20/287* (2013.01); *B01J 20/3242* (2013.01); *B01D 15/10* (2013.01); *B01J 20/284* (2013.01); *B01J 20/285* (2013.01)

(58) Field of Classification Search
   CPC ...... B01J 20/283; B01J 20/284; B01J 20/285; B01J 20/287
   See application file for complete search history.

(56) References Cited

U.S. PATENT DOCUMENTS

| | | |
|---|---|---|
| 6,264,893 B1 | 7/2001 | Markoski |
| 6,479,300 B1 | 9/2002 | Jiang et al. |
| 6,485,687 B1 | 9/2002 | Spangenberg et al. |
| 6,685,828 B2 | 2/2004 | Berger et al. |
| 6,783,988 B1 | 9/2004 | Dinh et al. |
| 7,048,517 B2 | 5/2006 | Berger et al. |
| 7,557,232 B2 | 7/2009 | Liu et al. |
| 2003/0224133 A1 | 12/2003 | Kanehara et al. |
| 2010/0147770 A1 | 6/2010 | Fryxell et al. |

OTHER PUBLICATIONS

Sripada, Kishore. Metal ion containing liquid chromatographic stationary phases for the analysis of polycyclic aromatic sulfur heterocycles in fossil fuels. Dissertation (2005), p. 59-67, 86.*

Battaglia et al. (1980) "HPLC-separation of cis and trans monounsaturated fatty acids", Chromatographia 13 (7):428-431.

D'Andrea et al. (2007) "An Efficient Method for Isolating Individual Long-Chain Alkenones for Compound-Specific Hydrogen Isotope Analysis", Analytical Chemistry 79(9): 3430-3435.

De Ligny (1976) "The investigation of complex association by gas chromatography and related chromatographic and electrophoretic method" Advances in Chromatography 14:265-304.

Dean et al. (1993) "Au+, Ag+ and Cu+ attachment to polybutadiene in laser desorption at 1064-NM", Rapid Communications in Mass Spectrometry 7(1): 53-57.

De La Roche et al. (1971) "The selective utilization of diglyceride species into maize triglycerides", Lipids 6:537-540.

Guha et al. (1972) "Charge-transfer complexes of metals in the chromatographic separation of organic compounds", Journal of Chromatography 68(2): 325-343.

Heath et al. (1975) "Silver nitrate-high pressure liquid chromatography of geometrical isomers", J. Chromatogr. Sci. 13(8): 380-382.

Heath et al. (1977) "Analytical and preparative separation of geometrical isomers by high efficiency silver nitrate liquid chromatography", J. Chromatogr. Sci. 15:10-13.

Ittel et al. (1976) "Coordination of Unsaturated Molecules to Transition Metals", Advances of Organometallic Chemistry 14: 33-61.

Kasai et al. (1980) "Acetylene and ethylene complexes of copper and silver atoms. Matrix isolation ESR study", Journal of The American Chemical Society 102: 179-190.

Clarembeau et al. (1985) "Synthesis of selenoacetals", Tetrahedron 41(21): 4793-4812.

Morris (1966) "Separations of lipids by silver ion chromatography", Journal of Lipid Research 7:717-732.

Pettit et al. (1967) "A comparison of the donor properties of group VIB elements", Chemical Communications (London) 1179-1180.

Richter et al. (1989) "Organische Elektronenleiter und Vorstufen; Zur Darstellung von Hexa-natrium-benzenhexathiolat aus Hexakis-benzylthio-benzen" Zeitschrift fuer Chemie, 29(12): 444-445. (Translation not currently available).

International Search Report and Written Opinion of the International Searching Authority dated Apr. 9, 2012 in PCT/US2011/046810 (11 pages).

Skoog et al. (1998) "High-performance liquid chromatography" Principles of Instrumental Analysis (fifth edition) Brooks Cole publishing, ch. 28 p. 725-743.

Skoog et al. (2006) "Liquid chromatography" Principles of Instrumental Analysis (sixth edition) Brooks Cole publishing, ch.28, p. 816-853.

Wasiak (1987) "GC investigation of olefins with chemically bonded gamma-mercaptopropylsilane-copper(II) complexes", Chromatographia 23(6): 423-426.

Ruhland T, et al. Selenium-Linking 1-9,14, Strategy for Traceless Solid-Phase Synthesis: Direct Loading, Aliphatic C—H Bond Formation upon Cleavage and Reaction Monitoring by Gradient MAS NMR Spectroscopy. 1998, The Journal of Organic Chemistry, vol. 1. 63, No. 25, pp. 9204-9211.

Supplementary European Search Report received in EP11815387.3 dated Jun. 26, 2017 (13 pgs.).

Lee et al., "Synthesis of Thiol Functionalized Organo—Ceramic Adsorbent by Sol-Gel Technology", Reactive and Functional Polymers, vol. 49, No. 2, Sep. 30, 2001, pp. 159-172.

Dillon et al., "Efficient liquid chromatographic analysis of mono-, di-, and triglycerols using silver thiolate stationary phase", Journal of Chromatography A, 1240 (2012) 90-95.

Dillon et al., "Thin layer chromatography in the separation of unsaturated organic compounds using silver-thiolate chromatographic material", Journal of Chromatography A, 1251 (2012) 240-243.

Aponte et al., "Separation of unsaturated organic compounds using silver-thiolate chromatographic material", Journal of Chromatography A, 1240 (2012) 83-89.

* cited by examiner

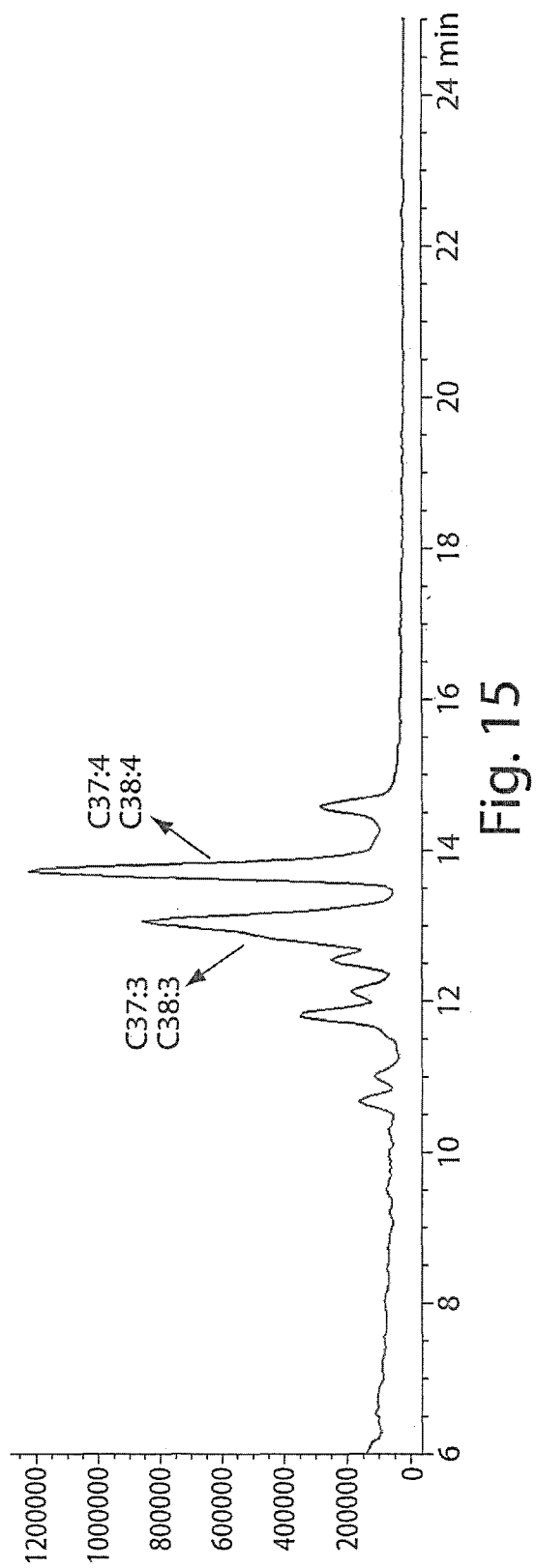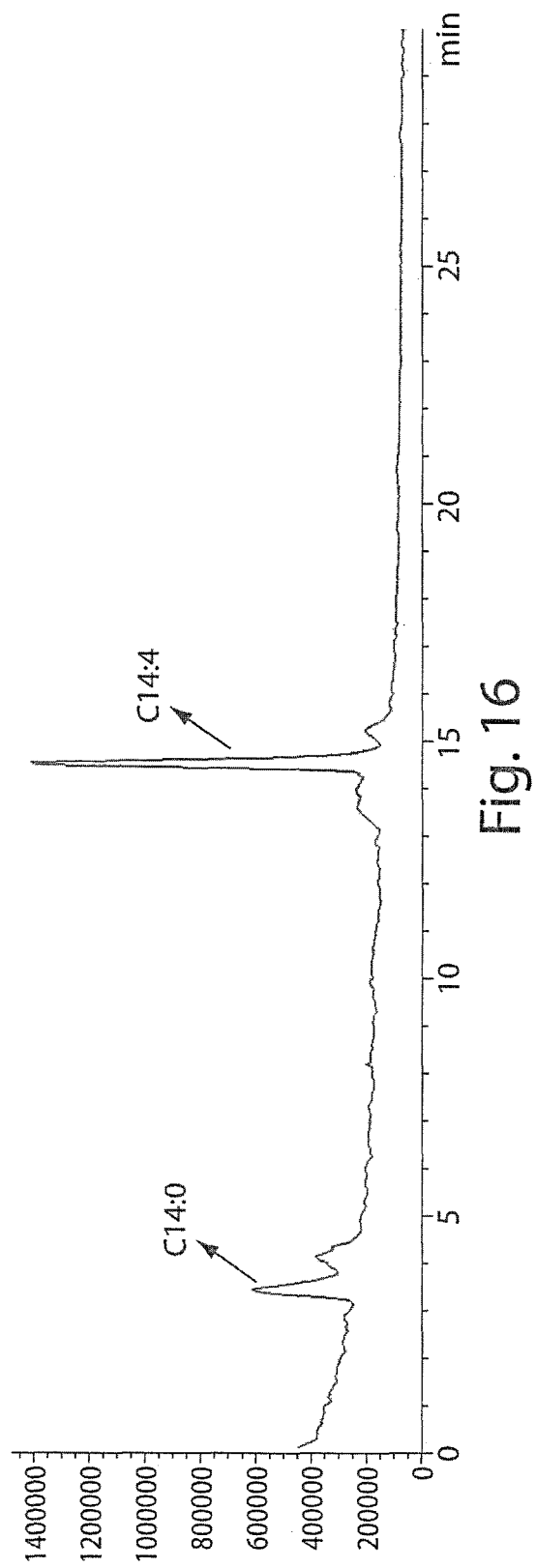

FUNCTIONALIZED CHROMATOGRAPHIC MATERIALS AND METHODS OF MAKING AND USING THEREFOR

RELATED APPLICATION

The present U.S. continuation utility application claims the benefit of international application number PCT/US2011/046810 filed Aug. 5. 2011 entitled "Functionalized chromatographic materials and methods of making and using therefor" by inventors Yongsong Huang, Jose C. Aponte, Rafael Tarozo, and James Dillon, which claims the benefit of U.S. provisional application Ser. No. 61/371,207 filed Aug. 6, 2010 in the U.S. Patent and Trademark Office, each of which is incorporated herein by reference in its entirety.

GOVERNMENT FUNDING

This invention was made with government support under National Aeronautics and Space Administration (NASA) Astrobiology and Exobiology grant NNX09AM82G and National Science Foundation (NSF) grant EAR-0902805. The government has certain rights in the invention.

FIELD OF INVENTION

Sulfur-containing or selenium-containing chromatographic media functionalized with transition metals are provided for reusable reproducible efficient separations of organic chemicals.

BACKGROUND

Chromatography is a widely used technique for separating organic and inorganic compounds and substances, e.g., amino acids, proteins, nucleic acids, hydrocarbons, and carbohydrates. Effective chromatography is influenced mainly by efficiency and selectivity of a chromatographic medium with respect to specific compounds of interest. Major improvements in column efficiency can be obtained by using more uniform particle size, or in the case of high performance liquid chromatography (HPLC), decreasing particle size of the packing material. For example in the past 25 years, typical particle size for HPLC has decreased from the early 10 µm (micrometer or micron) to 1.8 µm, which has resulted in greatly increased column efficiency. However, reduction in particle sizes results in a disadvantage which is a requirement for higher operating pressures and a need for more sophisticated design and expensive instrumentation such as ultra-high pressure liquid chromatography (UHPLC) systems. See Skoog et al. 1998 Principles of Instrumental Analysis (fifth edition) Brooks Cole publishing p. 725-743; and Skoog et al. 2006 Principles of Instrumental Analysis (sixth edition) Brooks Cole publishing chapter 28.

A more effective approach for improving compound resolution is to alter the column selectivity of the chromatographic medium with respect to specific compounds. The packing material for liquid chromatography is commonly based on porous silica particles. The silanol functional groups on the silica surface can be modified by conjugating with a variety of alkyl and other functional groups to change the affinity and selectivity of the packing materials to different compounds. For example, attaching a $C_{18}$ alkyl chain on the silanol group creates so called reversed-phase liquid chromatographic media that are widely used for separating polar organic compounds. Other ways of modifying the resolution properties of silica gel include physically attaching compounds or ions onto the surface of porous silica particles. For example, silver ion ($Ag^+$) has been attached by a process referred to as impregnation onto the silica surface by immersing the silica gel in an aqueous solution of silver nitrate ($AgNO_3$). Upon evaporating of water from the solution, the silver ion is deposited and electrostatically attached to the surface of silica gel on the silanol functional group. Because $Ag^+$ ions strongly interact with double bonds in organic compounds, silver impregnated silica gel is widely used for resolving compounds with different degrees of unsaturation (i.e., different numbers of double bonds or triple bonds) by a process referred to as argentation chromatography. Argentation chromatography has been used for chromatographic separation for more than five decades and is considered a critical technique for separating carbon-carbon double bond containing compounds especially lipids.

Problems with argentation chromatography include instability of impregnated $Ag^+$ ions, which are reduced to $Ag^0$ upon exposure to light within minutes, and instability of the medium, as the ions are merely electrostatically affiliated with the silanol functional group of the silica gel and are easily washed out. Conventional argentation chromatography is generally performed in darkness, which is difficult to achieve in the laboratory, and the medium must be freshly prepared (either by the researchers themselves or by commercial providers) and stored in light blocking containers and under anhydrous conditions. Because a certain level of light exposure is unavoidable, even the most carefully prepared and light-shielded chromatographic column can be reproducibly used only once and must be discarded after a single separation, leading to increased expense, inconvenience, and irreproducible results. Hence current argentation chromatography is time consuming and expensive, particularly for large scale projects. Furthermore, because $Ag^+$ ions are attached to the silica gel surface only electrostatically, during a chromatographic elution the $Ag^+$ ions are mobile during interaction with double bond-containing organic compounds. The resulting partially mobile affinity material of an intended stationary phase support medium causes peak tailing and severe reduction in chromatographic resolution. In addition, $Ag^+$ ions continuously bleed into the liquid eluants, which contaminates detection devices, and is particularly destructive to mass spectrometers, making HPLC mass spectrometry or HPLC-MS (which is an increasingly common technique for analyzing polar organic compounds) applications practically impossible to perform. These problems have served as roadblocks to further development of methods of separation that involve argentation chromatographic media.

Silver ion chromatography in spite of these shortcomings remains in use. There are currently no chromatographic media that specifically target dense electron clouds (such as triple bonds and double bonds) in the molecules and separate these molecules. Improved silver chromatographic materials are needed for medical, industrial and pharmaceutical applications.

SUMMARY

An embodiment of the invention provides a chromatographic medium including a sulfur-containing functional group (metal thiolate chromatographic medium, MTCM) or a selenium-containing functional group (metal selenolate chromatographic medium or metal selenol-mercaptide chromatographic medium, MSCM) covalently bound to a metal atom, such that the medium has affinity and specificity to bind a compound comprising a carbon-carbon double bond or other electron rich functional groups. The MTCM or MSCM eliminates the instability problem encountered in silver ion chromatography, and enhances the chromatographic resolution of electron rich compounds, including compounds having double and triple bonds.

In various embodiments provided herein, the metal is a transition metal, for example a metal selected from: silver ($Ag^+$), copper ($Cu^+$ and $Cu^{2+}$), gold ($Au^+$), cadmium ($Cd^{2+}$), zinc ($Zn^{2+}$), mercury ($Hg^{2+}$), nickel ($Ni^+$), palladium ($Pd^{2+}$), platinum ($Pt^{2+}$), rhodium ($Rh^{2+}$), ruthenium ($Ru^{3+}$ and $Ru^{4+}$), and a combination thereof. In various embodiments provided herein, the support medium is selected from: silica gel, alumina, polystyrene, agarose, modified polymeric resin, cellulose, and starch. Alternatively, the support medium is magnesium silicate or dextran.

In various embodiments provided herein, the sulfur-containing functional group includes a thiol. In related embodiments, a propyl thiol substitution is performed and the substitution is combined with hydroxylpropyl, cyano propyl or butyl propyl substitutions in various proportions to form combined chromatographic stationary phases with different degrees of normal and reversed-phase properties. In certain embodiments, alkyl chains connecting these different functional groups are varied and include $C_1$ to $C_{18}$ groups that impart different properties to the MTCM or the MSCM. For example, a terminal epoxy alkyl functional group with variable carbon chain length is connected to and modified into a 1-thiol; 2-hydroxyl; 1 hydroxyl; 1-thiol-2-hydroxyl; 1-hydroxyl-2-thiol; 1,2-dithiol or 2-thiol terminal functional group. The functional groups display higher degrees of normal phase chromatographic behavior than their corresponding unmodified materials, and for example bond bivalent cations more efficiently.

In related embodiments, the sulfur-containing functional group or the selenium-containing functional group is linked to the support medium by at least one spacer selected from: a ($C_1$-$C_{18}$)alkyl, a ($C_1$-$C_{18}$)alkoxy, a ($C_1$-$C_{18}$)heteroalkyl, a ($C_6$-$C_{10}$)aryl, a ($C_1$-$C_9$)heteroaryl, and a ($C_6$-$C_{10}$)aryl($C_1$-$C_6$)alkyl. In various embodiments provided herein, the MTCM or the MSCM further includes a covalently modified silicon atom selected from: a ($C_1$-$C_{18}$)alcohol, a ($C_1$-$C_{18}$) nitrile, a ($C_1$-$C_{18}$)carbonyl, a ($C_1$-$C_{18}$)ester, and a ($C_1$-$C_{18}$) alkoxy.

In various embodiments provided herein, the MTCM or the MSCM has affinity to at least one compound selected from: a polycyclic aromatic hydrocarbon, an alkene, an alkenone, a triglyceride, a monoglyceride, a diglyceride, a wax ester, a steryl ester, a phthalate, a sterol, a steroid, a terpene, a terpenoid, a triterpernoid, a fatty acid, a lipid including a phospholipid and other complex lipid molecules, an oil, a sugar, an oligosaccharide, a polysaccharide, a carbohydrate, a protein, an amino acid, a fossil fuel, a natural or synthetic organic compound of pharmaceutical use, a petroleum-derived compound, a coal-derived compound, and a combination thereof found in a biological sample or an environmental sample. The biological sample from a subject including a human or animal is at least one of: an excretion, a secretion, tears, saliva, urine, feces, perspiration, blood, lymph, serum, plasma, cerebrospinal fluid, bile, semen, vaginal fluid, breast milk, and amniotic fluids. For example the biological sample is from a plant, bacteria or archea, and is obtained for example by solvent extraction. The environmental sample is at least one selected from: soil; water including samples from a river, a glacier, an ocean and a lake; sediment; algal deposits; oil deposits; and fossil deposits including coal and tar, and atmospheric aerosols.

In various embodiments provided herein, the compound containing the carbon-carbon double bond contains tens, hundreds or thousands of carbon atoms, for example the compound is at least about 1 carbon to about 20 carbons in length, at least about 20 carbons to about 40 carbons in length, at least about 20 carbons to at least about 80 carbons, at least about 40 carbons to about 80 carbons in length, at least about 40 carbons to at least about 150 carbons, at least 80 carbons to about 150 carbons in length, and greater than about 150 carbons in length. For example the compound containing a carbon-carbon double bond is a macromolecule, for example a polypeptide having 50 amino acids in length, i.e., hundreds of carbons in length.

In various embodiments provided herein, the MTCM or the MSCM forms an analytical component of a system selected from: normal phase chromatography, reversed-phase chromatography, liquid chromatography, planar chromatography, column chromatography, gravity or flush chromatography, flash chromatography, thin layer chromatography, high performance liquid chromatography, and gas chromatography. For example the MTCM or the MSCM forms an analytical component of a gas chromatography system, such that it separates small and volatile compounds at variable temperatures, for example at room temperature or at several hundred degrees celsius. In related embodiments, the MTCM component or the MSCM component in the system separates compounds having different numbers of carbon-carbon double bonds or carbon-carbon triple bonds. In related embodiments, the MTCM component or or the MSCM component in the system separates compounds having different carbon lengths. In related embodiments, the MTCM component or the MSCM component in the system separates at least one unsaturated compound from at least one saturated compound. For example, the MTCM component or the or the MSCM component in the system separates an alkane from an olefin, a di-unsaturated compound from a tetra-unsaturated compound, and a di-unsaturated $C_{50}$ compound from a di-unsaturated $C_{51}$ compound.

In various embodiments provided herein, the MTCM or the MSCM is characterized by having at least one property selected from: reusable, not staining a user, and stable during storage at room temperature under conditions of ambient light or at temperatures below 60° C. For example, the MTCM or the MSCM is stable over a period of days, weeks, months, and even years under certain conditions.

In various embodiments provided herein, the metal is characterized by being strongly bonded and fixedly attached to the sulfur-containing functional group, and not leaching into or being dragging out of the MTCM or MSCM for example by solvents and unsaturated compounds. For example, a silver-based MTCM or silver-based MSCM contacted with either acetone or acetonitrile does not leach the silver metal.

An embodiment of the invention herein provides a method for making a chromatographic material for separating and identifying compounds, the method including: reacting a support medium to a metal reagent, such that the medium includes a thiol sulfur-containing functional group or a selenolate selenium-containing functional group, such that the thiol sulfur-containing functional group or the selenolate selenium-containing functional group covalently binds the metal reagent, thereby forming the chromatographic material for separating and identifying compounds.

In various embodiments provided herein, the method further includes stirring, sonicating and filtering a resulting solid formed by contacting and bonding the support medium to the metal reagent; washing the resulting solid with a fluid; and, drying the resulting solid. In various embodiments provided herein, the fluid is selected from the group consisting of: chloroform, dichloromethane, ethyl acetate, diethyl ether, acetic acid, hexane, ethanol, methanol, acetone, tetrahydrofuran, toluene, dimethyl sulfoxide, acetonitrile, and a combination thereof.

In various embodiments provided herein, the metal is selected from: silver, copper, gold, cadmium, zinc, nickel, palladium, platinum, rhodium, mercury, and a combination thereof. For example, the metal includes silver nitrate, copper (I) chloride, and copper (II) chloride.

In various embodiments provided herein, the support medium is covalently linked to the thiol sulfur-containing functional group or selenolate selenium-containing functional group by at least one spacer selected from the group consisting of: a $(C_1-C_{18})$alkyl, a $(C_1C_{18})$alkoxy, a $(C_1-C_{18})$heteroalkyl, a $(C_6-C_{10})$aryl, a $(C_1-C_9)$heteroaryl, and a $(C_6-C_{10})$aryl$(C_1-C_6)$alkyl. In various embodiments provided herein, the support medium further includes a covalently modified silicon atom selected from: a $(C_1-C_{18})$alcohol, a $(C_1-C_{18})$nitrile, a $(C_1-C_{18})$carbonyl, a $(C_1-C_{18})$ester, and a $(C_1-C_{18})$alkoxy.

In various embodiments provided herein, prior to reacting, the method includes reacting a substrate with at least one trimethoxysilane compound selected from:
3-mercaptopropyltrimethoxysilane, 3-hydroxypropyltrimethoxysilane,
3-glycidoxypropyltrimethoxysilane, n-butyltrimethoxysilane, and
3-cyanopropyltrimethoxysilane; refluxing a resulting solid with stirring; washing the resulting solid with a wash fluid, thereby forming the support medium.

In various embodiments provided herein, the substrate includes an activated silica gel. In various embodiments provided herein, the wash fluid is at least one solution selected from: chloroform, dichloromethane, ethyl acetate, diethyl ether, acetic acid, hexane, toluene, ethanol, acetone, methanol, tetrahydrofuran, dimethyl sulfoxide, acetonitrile, and a combination thereof.

In various embodiments provided herein, the support medium is selected from: silica gel, alumina, polystyrene, agarose, modified polymeric resin, cellulose, magnesium silicate, dextran, and starch.

In various embodiments provided herein, the method further includes mixing the support medium and metal reagent in a particular ratio, and the ratio of medium to metal reagent is selected from: 1:1, 2:1, 4:1, 5:1, 6:1, 8:1, 10:1 and 12:1. For example, the ratio of medium to metal reagent is 5:1 to 20:1 by weight. Alternatively, the ratio of medium to metal reagent is selected from: about 1:1 to about 1:5, about 1:5 to about 1:10, about 1:10 to about 1:20, and about 1:20 to about 1:30.

In various embodiments provided herein, the method further includes mixing the chromatographic material with additional support medium not attached to a metal reagent, such that mixing comprises adding in a ratio the chromatographic material and additional support medium. For example, the method includes mixing the medium with conventional stationary phases having the same particle size at numerous ratios in order to produce media having different chromatographic properties.

Another embodiment of the invention provides a method for separating or identifying compounds in a sample including: contacting a metal-thiolate chromatographic medium (MTCM) or metal-selenolate chromatographic medium (MSCM) with the sample, such that the MTCM or the MSCM includes a support medium attached to a sulfur-containing functional group or to a selenium-containing functional group respectively, such that the sulfur-containing functional group or the selenolate selenium-containing functional group is covalently bonded to a metal atom, such that the sample includes a plurality of compounds and at least one compound that specifically binds to the MTCM or the MSCM; and, separating and identifying the at least one compound from a plurality of compounds, for example, separating the compound from other components of the sample, preparatively or analytically.

In various embodiments provided herein, the metal atom is a transition metal. In various embodiments provided herein, the transition metal is at least one selected from: silver, mercury, gold, copper, cadmium, zinc, nickel, palladium, rhodium, platinum, and a combination thereof.

In various embodiments provided herein, the sulfur-containing functional group is a thiol. In various embodiments provided herein, the at least one compound includes or contains a carbon-carbon double bond.

In various embodiments provided herein, the at least one compound is selected from: a polycyclic aromatic hydrocarbon, an alkene, an alkenone, a triglyceride, a monoglyceride, a diglyceride, a wax ester, a steryl ester, a phthalate, a sterol, a steroid, a terpene, a terpenoid, a triterpernoid, a lipid, a phospholipid, a fatty acid, an oil, a sugar, an oligosaccharide, a polysaccharide, a carbohydrate, a protein, an amino acid, a fossil fuel, a natural or synthetic organic compound of pharmaceutical use, a petroleum-derived compound, a coal-derived compound, and a combination thereof found in a biological sample or an environmental sample, such that the biological sample is selected from: an excretion, a secretion, blood, lymph, serum, plasma, cerebrospinal fluid, bile, and amniotic fluids, and such that the environmental sample is selected from: soil samples; water samples including samples from: a river, a glacier, an ocean, and a lake; an atmospheric aerosol; sediment samples; algal deposits; oil deposits; and fossil deposits. In related embodiments, the at least one compound is selected from: a mono-unsaturated $C_{37}$-$C_{39}$ alkenone, a di-unsaturated $C_{37}$-$C_{39}$ alkenone, a tri-unsaturated $C_{37}$-$C_{39}$ alkenone, and a tetra-unsaturated $C_{37}$-$C_{39}$ alkenone.

In various embodiments provided herein, prior to identifying, the method further includes eluting the at least one compound from the MTCM or the MSCM. For example, eluting the compound includes a gradient elution. In various embodiments provided herein, eluting includes selecting and using an elution fluid. In various embodiments provided herein, the elution fluid includes at least one fluid selected from: dichloromethane, ethyl acetate, diethyl ether, water, acetic acid, hexane, ethanol, methanol, acetonitrile, and a combination thereof. For example, the elution fluid includes water containing different modifiers, or a mixing ratio of hexane, dichloromethane, acetonitrile, methanol and ethyl acetate. In various embodiments provided herein, the elution fluid includes at least one aqueous salt solution. For example, the aqueous salt solution includes sodium borate or phosphate buffer.

In various embodiments provided herein, detecting of compounds further includes using an optical or electronic device, for example an diode array detector, an evaporative light scattering detector, a fluorescence detector, a flame ionization detector, or a mass spectrometer. In various embodiments provided herein, the optical device includes an analyzer component of a liquid chromatography device. In various embodiments provided herein, the gas chromatography device further interfaces to a mass spectrometer. Alternatively, the optical device includes an ultraviolet detector.

In various embodiments provided herein, the MTCM or the MSCM forms an analytical component of a system selected from: normal phase chromatography, reversed-phase chromatography, liquid chromatography, planar chromatography, column chromatography, thin layer chromatography, solid phase extraction chromatography, flush chromatography, flash chromatography, high performance liquid chromatography, gas chromatography, and supercritical fluid chromatography.

In various embodiments provided herein, detecting further includes analyzing an amount of at least one naturally-occurring isotope. In various embodiments provided herein, the at least one naturally-occurring isotope is selected from: carbon, hydrogen, phosphorous, nitrogen, oxygen, and sulfur. For example, the naturally-occurring isotope is carbon-13 ($^{13}C$), phosphorus-31($^{31}P$), deuterium ($^{2}H$), or oxygen-18 ($^{18}O$).

In various embodiments, the method further includes prior to detecting, washing the MTCM or the MSCM to remove unbound molecules. In various embodiments provided herein, the support medium includes a silica gel. In various embodiments provided herein, the support medium includes a material selected from: silica gel, alumina, polystyrene, agarose, modified polymeric resin, cellulose, magnesium silicate, dextran, and starch.

In various embodiments provided herein, the sample is selected from: a polycyclic aromatic hydrocarbon, an alkene, an alkenone, a triglyceride, a monoglyceride, a diglyceride, a wax ester, a steryl ester, a phthalate, a sterol, a steroid, a terpene, a terpenoid, a triterpernoid, a lipid, a phospholipid, a fatty acid, an oil, a sugar, an oligosaccharide, a polysaccharide, a carbohydrate, a protein, an amino acid, a fossil fuel, a natural or synthetic organic compound of pharmaceutical use, a petroleum-derived compound, a coal-derived compound, and a combination thereof found in a biological sample or an environmental sample, wherein the biological sample is selected from: an excretion, a secretion, blood, lymph, serum, plasma, cerebrospinal fluid, bile, and amniotic fluids, and wherein the environmental sample is selected from: soil samples; water samples comprising samples from: a river, a glacier, an ocean, and a lake; an atmospheric aerosol; sediment samples; algal deposits; oil deposits; and fossil deposits. In a related embodiment, the sample includes a gaseous or liquid material including saturated and unsaturated carbon compounds.

In related embodiments, the sample includes an unsaturated lipid. In various embodiments provided herein, the unsaturated lipid is obtained from an alga, for example the alga is a member of Prymnesiophyceae.

In various embodiments provided herein, the MTCM component or the MSCM component in the system separates compounds having different numbers of carbon-carbon double bonds. In various embodiments provided herein, the MTCM component or the MSCM component in the system separates compounds having different carbon lengths. In various embodiments provided herein, the MTCM component or the MSCM component in the system separates at least one unsaturated compound from at least one saturated compound. In various embodiments provided herein, the MTCM component or the MSCM component in the system separates the at least one compound from at least one impurity.

In various embodiments, the method further includes storing the MTCM or the MSCM at room temperature under ambient light, and the MTCM and MSCM is stable under such a condition. In various embodiments, the method includes using both the MTSM and MSCM to effectively separate and identify the compounds.

An aspect of the invention provides a device for separating and identifying molecules in a sample, the device including: a solid phase extraction (SPE) cartridge including a metal-thiolate chromatographic medium (MTCM), such that the MTCM includes a support medium attached to a sulfur-containing functional group, such that the sulfur-containing functional group is covalently bonded to a metal atom, such that the MTCM has affinity and specificity to bind a compound containing a carbon-carbon double bond.

An aspect of the invention provides a device for separating and identifying molecules in a sample, the device including: a solid phase extraction (SPE) cartridge including a metal-selenolate chromatographic medium (MSCM) that includes a support medium attached to a selenium-containing functional group, such that the selenium-containing functional group is covalently bonded to a metal atom, such that the MSCM has affinity and specificity to bind a compound comprising a carbon-carbon double bond.

In various embodiments, the device including the MTCM and/or the MSCM has affinity to other electron rich functional groups in organic molecules including carbonyl groups, aromatic systems, and unpaired electrons on nitrogen atoms.

In various embodiments of the device provided herein, the metal is selected from: silver, mercury, gold, copper, cadmium, zinc, nickel, palladium, platinum, rhodium, and a combination thereof.

In various embodiments of the device provided herein, the support medium is selected from: silica gel, alumina, polystyrene, agarose, modified polymeric resin, cellulose, magnesium silicate, dextran, and starch. In various embodiments, the device further includes a filter or a mesh. In various embodiments, the device further includes an adaptor for connecting the device to a container or a syringe. In various embodiments, the device includes a stability solution for preventing fungal or microbial growth on the medium.

An embodiment of the invention provides a kit for isolating compounds including: a metal-thiolate chromatographic medium (MTCM) including a sulfur-containing functional group covalently attached to a support medium, such that the sulfur-containing functional group is bonded to at least one metal atom, such that the MTCM has affinity and specificity to at least one compound containing a carbon-carbon double bond; and, a container.

An embodiment of the invention provides a kit for isolating compounds including: a metal-selenolate chromatographic medium (MSCM) including a selenium-containing functional group covalently attached to a support medium, such that the selenium-containing functional group is bonded to at least one metal atom, such that the MSCM has affinity and specificity to at least one compound containing a carbon-carbon double bond; and, a container.

In various embodiments provided herein, the kit further includes instructions for use in a chromatographic column. In various embodiments provided herein, the metal atom is selected from: silver, mercury, gold, copper, cadmium, zinc, nickel, palladium, platinum, rhodium, and a combination thereof.

In various embodiments provided herein, the kit further includes a control compound with an affinity for the medium. In various embodiments provided herein, the control includes at least one material selected from: a polycyclic aromatic hydrocarbon, an alkene, an alkenone, a triglyceride, a monoglyceride, a diglyceride, a wax ester, a steryl ester, a phthalate, a sterol, a steroid, a terpene, a terpenoid, a triterpernoid, a lipid, a phospholipid, a fatty acid, an oil, a sugar, an oligosaccharide, a polysaccharide, a carbohydrate, a protein, an amino acid, a fossil fuel, a natural or synthetic organic compound of pharmaceutical use, a petroleum-derived compound, a coal-derived compound, and a combination thereof found in a biological sample or an environmental sample, wherein the biological sample is selected from: an excretion, a secretion, blood, lymph, serum, plasma, cerebrospinal fluid, bile, and amniotic fluids, and wherein the environmental sample is selected from: soil samples; water samples comprising samples from: a river, a glacier, an ocean, and a lake; an atmospheric aerosol; sediment samples; algal deposits; oil deposits; and fossil deposits.

An embodiment of the invention provides a method of purifying a compound in a sample including: contacting a devices as provided herein with the sample; and, collecting flow-through from the device, such that the compound in the flow through is purified from contaminants in the sample, which remain bound to medium retained in the device. For example, the method involves collecting flow-through solvents from the device, such that the compound in the flow-through is purified from unwanted compounds in the sample, which elute earlier than the target compounds.

BRIEF DESCRIPTION OF DRAWINGS

FIG. 5 panel A shows the reaction of a silica gel with glycidoxypropyltrimethoxysilane in perchloric acid to yield a diol-silica gel and methanol.

FIG. 5 panel B shows the reaction of the dial-silica gel formed in FIG. 5 panel A with sodium sulfide and hydrogen sulfide in methanol to yield a thiol-hydroxy silica gel.

FIG. 6 panel A shows the reaction of silica gel with 3-glycidoxypropyltrimethoxysilane to yield an epoxy-silica gel.

FIG. 6 panel B shows the reaction of the epoxy-silica gel formed in FIG. 6 panel A with sodium sulfide and hydrogen sulfide in methanol to yield a thiol-hydroxy silica gel.

FIG. 7 panel A shows the reaction of 3-chloropropyltrimethoxysilane with aqueous sodium hydroxide to yield 3-hydroxypropyltrimethoxysilane.

FIG. 7 panel B shows the reaction of a silica gel with 3-mercaptopropyltrimethoxysilane and 3-hydroxypropyltrimethoxysilane to yield a thiol-hydroxy silica gel.

FIG. 8 panel A shows the reaction of trimethoxysilane with an allyl-terminal alkene chloride in the presence of a ruthenium catalyst, ruthenium chloride or triruthenium dodecacarbonyl, and yielding a chloro-alkyl-trimethoxy silane compound. In the reagents and products shown in the reaction, n indicates the number carbon atoms.

FIG. 8 panel B shows the reaction of trichlorosilane with an allyl-terminal alkene chloride in the presence of a platinum catalyst to yield a chloro-alkyl-trichlorosilane product, which is then reacted with methanol to replace the chlorine substituents on the silane with methoxy groups. In the reagents and products shown in the reactions, n indicates the number carbon atoms.

FIG. 8 panel C shows a reaction of a chloro-alkyl-trimethoxy silane compound with sodium cyanide, sodium thiol or sodium hydroxide to produce trimethoxysilane compounds substituted with cyanide, thiol, and hydroxyl, respectively, as reagents for modification of silica gels.

FIG. 9 panel A is a chromatographic trace showing data obtained from chromatographic separation of a mixture of a saturated compound and mono-, di-, and tetra-unsaturated tetradecane ($C_{14}$) compounds using a column loaded with covalently bonded medium which is an alkyl-silver-thiolate silica gel, a silver-thiolate modified silica gel. The data show that the silica gel material completely separated the compounds in mixture within 60 fractions, the compounds eluting in the following order: saturated, mono-unsaturated, the di-unsaturated, and the tetra-unsaturated. Peaks eluting at about 3, 10, 28 and 55 fractions were fully isolated, separated by fractions having no material. Data show sharp peaks in this separation and full resolution of target compounds. Fractions 1 to 16 were eluted with hexane, fractions 17 to 32 were eluted with hexane:dichloromethane (9:1), fractions 33 to 48 were eluted with dichloromethane, and fractions 49 to 69 were eluted with acetone.

FIG. 9 panel B is a trace showing data obtained by the chromatographic separation of unsaturated and mono-, di-, and tetra-unsaturated $C_{14}$ compounds using a column containing the control "normal" original unmodified silica gel. Data show that the elution peaks for the unsaturated $C_{14}$ compound and the mono- and di-unsaturated $C_{14}$ compounds were not well separated compared to FIG. 9 panel A. Data show also that separating the compounds using the unmodified silica gel resulted in elution peaks that were broad and overlapping. The compounds were eluted within 11 fractions. The normal unmodified silica gel had little retention for compounds with different double bonds, specifically the $C_{14}$ compound containing four carbon-carbon double bonds had slight retention to this column due to its slightly higher polarity.

FIG. 9 panel C is a tracing showing data obtained by the chromatographic separation of unsaturated and mono-, di-, and tetra-unsaturated $C_{14}$ compounds using a column containing 10% $AgNO_3$ silica gel obtained from Sigma-Aldrich (St. Louis, Mo.). Data show that the elution peaks of the unsaturated compounds in the final three peaks obtained from the silver impregnated medium were not well separated compared to data in FIG. 9 panel A. The 10% AgNO3 silica gel obtained from Sigma-Aldrich yielded broad peaks for the $C_{14}$ compounds having one or two carbon-carbon double bonds likely as a result of partially mobile $Ag^+$ stationary phase that is flushed out of the column as the polarity of the solvent increases. The sharp peak for the $C_{14}$ compound having four carbon-carbon double bonds results from the strong affinity of $Ag^+$ with the molecule and elution of the compound with $Ag^+$. The commercially available $AgNO_3$ silica gel column may separate $C_{14}$ compound having one or two double bond if using strong polar solvents such as acetone, however using these solvents results in elution of not only the target compounds but also the $Ag^+$ ion from the column.

FIG. 10 panels A and B show that the copper thiolate silica gel media containing $Cu^{+1}$ (panel A) and $Cu^{+2}$ (panel B) separated the compounds.

FIG. 10 panel C shows that nickel thiolate silica gel medium yielded superimposed overlapping peaks which failed to separate the compounds.

FIG. 10 panel D shows that the mercury thiolate silica gel medium only partially separated the compounds.

FIG. 15 is a trace showing HPLC separation using a silver thiolate HPLC column of tri- and tetra-unsaturated $C_{37}$ and $C_{38}$ alkenones in an algal sample. Data show that the thiol-silver HPLC column effectively separated a mixture of tri-unsaturated $C_{37}$ and $C_{38}$ alkenones (C37:3 and C38:3; left arrow) from a mixture of tetra-unsaturated $C_{37}$ and $C_{38}$ alkenones (C37:4 and C38:4; right arrow) and from other peaks containing minor components.

FIG. 16 is a graph showing HPLC data using a silver thiolate HPLC column of chromatographic separation of a $C_{14}$ alkane from a tetra-unsaturated $C_{14}$ alkene. Data show that the thiol-silver HPLC column effectively separated the $C_{14}$ alkane (C14:0; left arrow) from the tetra-unsaturated alkene (C14:4; right arrow) and other minor components.

FIG. 17 panel A is a drawing showing a chemical reaction for synthesizing a di-thiol. A thiol silica gel having a silanol group on the silica gel surface is reacted with 3-chloropropylene sulfide in acetonitrile initially at 0° C. and warmed to room temperature (RT) for three hours, and with sulfur hydride in acetone and pyridine for three hours (FIG. 17 panel A top row). The resulting product is then reacted with silver nitrate in a solution of water and acetonitrile (1:1) to yield a silver di-thiol MTCM (FIG. 17 panel A bottom row).

FIG. 17 panel B is a drawing showing a chemical reaction for synthesizing a benzylmercaptan-substituted silver-based MTCM. Trimethoxysilyl)benzyl chloride is reacted with sulfure chloride in acetonitrile and pyridine, and silver nitrate in water and acetone (1:1) solution to yield a silver trimethoxysilylbenzylmercaptan.

FIG. 17 panel C is a set of drawings of a chemical reaction to synthesize a benzene hexathiol compound. Hexachlorobenzene is reacted with benzylmercaptan in dimethylformamide and sodium hydride to yield benzene hexathiol (FIG. 17 panel C top row). Also shown is a chemical reaction showing mercatopropylsilane reacting with benzene hexathiol to yield a benzene hexathiol substituted-mercatopropylsilane (FIG. 17 panel C bottom row).

FIG. 18 panel A shows a drawing of a chemical reaction involving reacting for 24 hours a silica gel with mercaptopropyltrimethoxysilane (MPTS) in o-xylene, n-butyl amine, and refluxing with stirring to yield a thiol silica gel with two silanol groups.

FIG. 18 panel B is a drawing of a chemical reaction showing the thiol silica produced in FIG. 18 panel A reacting for 16 hours with a silyalating agent ($Me_3SiR$) in acetonitrile with stirring to yield a end-capped thiol silica gel.

FIG. 18 panel C is a drawing of a chemical reaction showing the end-capped thiol silica gel produced in FIG. 18 panel B reacting with silver nitrate in a water/methanol solution (1:1) at RT with stirring for 20 minutes to yield an end-capped silver-based MTCM.

FIG. 20 panel A is a trace showing the silver thiolate HPLC data for separation of triglycerides in the olive oil sample.

FIG. 20 panel B is a trace showing the silver thiolate HPLC data for separation of triglycerides in the sesame seed oil sample.

FIG. 20 panel C is a trace showing the silver thiolate HPLC data for separation of triglycerides in the vegetable oil sample.

FIG. 21 panel A is a trace showing HPLC data for separation of EPA and DHA in a transesterified fish oil sample using silver thiolate medium. Data show strong peaks at about 9 minutes and 19 minutes and a weak peak at about 20.5 minutes.

FIG. 21 panel B is a trace showing HPLC data of a EPA standard sample. Data show that the EPA eluted at approximately 19 minutes.

FIG. 21 panel C a trace showing HPLC data for separation of a DHA standard sample. Data show that the DHA eluted at approximately 20.5 minutes.

FIG. 22 panel A is a trace showing the gas chromatography separation using a silver thiolate medium of EPA and DHA in a fish oil sample. Data show strong peaks identified between 8.5 minutes and 14 minutes. Peaks corresponded to compounds $C_{14}$:0 (8.5 minutes), $C_{16}$:1 (~9.4 minutes), $C_{16}$:0 (~9.6 minutes), $C_{18}$:3 (~10.9 minutes), $C_{18}$:1 (~11 minutes), $C_{18}$:0 (~18.2 minutes), $C_{20}$:5 (~12.3 minutes), and $C_{22}$:6 (~14 minutes).

FIG. 22 panel B is a trace of the gas chromatography data of the separated EPA peak from the fish oil sample in FIG. 22 panel A. The purified EPA ($C_{20}$:5) peak was detected at about 12.3 minutes.

FIG. 22 panel C is a trace of the gas chromatography data of the separated DHA peak from the fish oil sample in FIG. 22 panel A. The purified DHA ($C_{22}$:6) peak was detected at about 12.3 minutes.

FIG. 23 panel A is a trace showing the silver-based MTCM HPLC and MS separation of triglycerides in the olive oil sample. The HPLC data showed triglycerides POS, POO, OOO, OOL, and OLL.

FIG. 23 panel B is a trace showing the silver-based MTCM HPLC and ELSD separation of triglycerides in the olive oil sample. The HPLC data showed triglycerides POS, POO, OOO, OOL, and OLL.

FIG. 23 panel C is a MS analysis of the POS peak shown in FIG. 23 panel A.

FIG. 23 panel D is a MS analysis of the OOP peak shown in FIG. 23 panel A.

FIG. 23 panel E is a MS analysis of the OOO peak shown in FIG. 23 panel A.

FIG. 23 panel F is a MS analysis of the OOL peak shown in FIG. 23 panel A.

FIG. 24 panel A is a trace of liquid chromatographic separations of 14 carbon molecules using a cyano functionalized silver impregnated silica gel.

FIG. 24 panel B is a trace of liquid chromatographic separations of 14 carbon molecules using a cyano/thiol functionalized (silver-based MTCM) silica gel. The elutions from left to right are of saturated linear carbon compound, the monosaturated linear compound, di-unsaturated linear compound, phrenanthrene, and the tetra-unsaturated linear compound.

FIG. 24 panel C is a trace of liquid chromatographic separations of 14 carbon molecules using a DMT functionalized silver silica gel. The elutions from left to right are of saturated linear carbon compound, di-unsaturated linear compound, phrenanthrene, the monosaturated linear compound, and the tetra-unsaturated linear compound.

FIG. 24 panel D is a trace of liquid chromatographic separations of 14 carbon molecules using a cysteine functionalized silver silica gel. The phrenanthrene peak is the sole peak eluted in the hexane/dichloromethane (9:1) region.

FIG. 27 panel A is a drawing showing a TLC plate (20 cm wide plate) separation of FAMEs using a silver-based MTCM (AgTCM). The FAMEs separated include mono-saturated $C_{16}$ and $C_{18}$ compounds and polyunsaturated compounds including compounds having two, three, five or six degrees of unsaturation (i.e., number of carbon-carbon double bounds).

FIG. 27 panel B is a drawing showing retention values (Rf) on the ordinate as a function of type of fatty acid methyl ester having different number of double bonds (abscissa) using a TLC plate containing AgTCM.

FIG. 27 panel C is a photograph of the developed AgTCM-TLC plate in FIG. 27 panel B after staining with six molar (6M) sulfuric acid using a chromatography sprayer. FAMEs are circled.

FIG. 28 panel A is a drawing of a chemical reaction for synthesizing a silver(I) propylselenol trimethoxysilane. The chemical reaction shows reacting 3-bromopropyltrimethoxysilane with potassium selenocyanate (KSeCN) in acetone, and then sodium borohydride ($NaBH_4$) in ethanol to yield a selenol silane, which is then reacted with silver nitrate in water/acetonitrile (1:1) to yield a silver(1)propylselenol trimethoxysilane.

FIG. 28 panel B is a drawing of a chemical reaction for synthesizing a silver(I)benzylesterselenol trimethoxysilane. The chemical reactions shows reacting 3-hydroxypropyltrimethoxysilane with a selenium benzyl ester under acidic conditions to yield a selenol silane with an aromatic ring.

Figure 1:
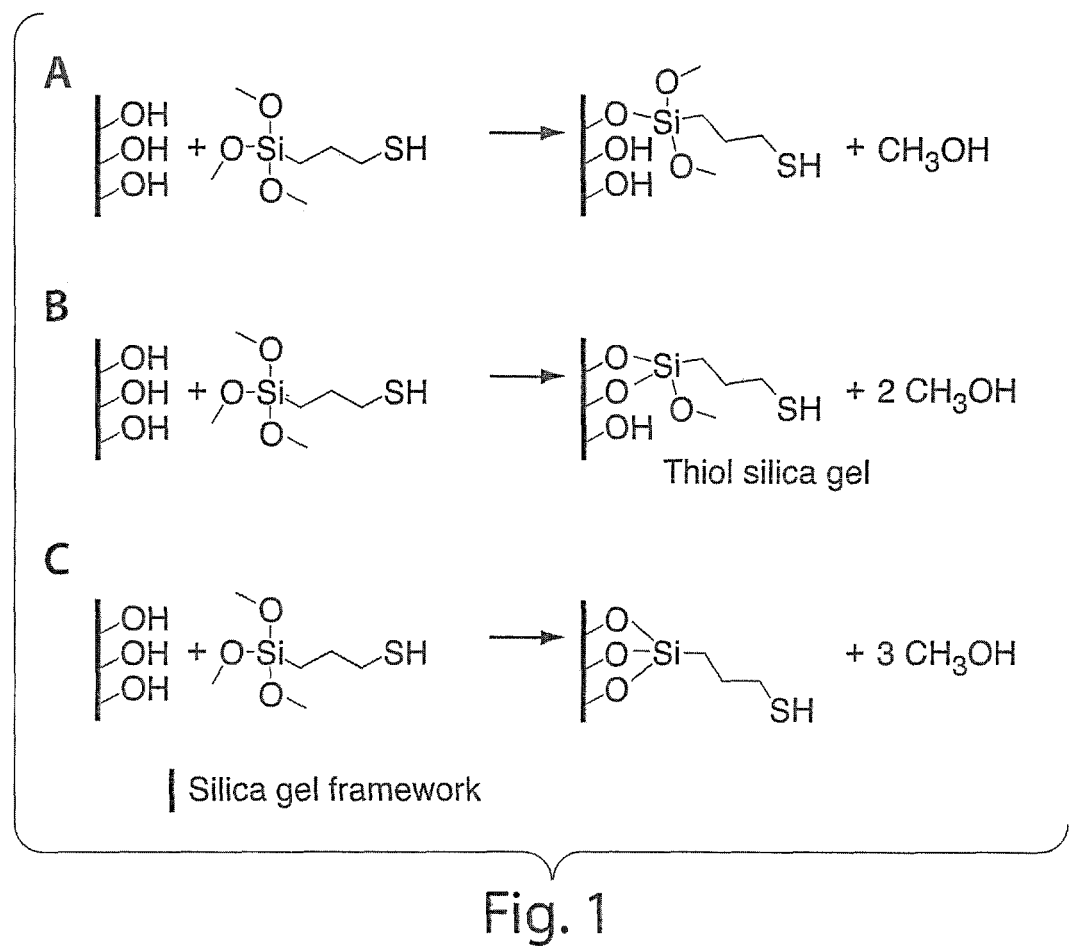
FIG. 1 is a set of drawings showing a chemical reaction of a silica gel framework reacting with a mercaptopropyl-silane moiety to form one (panel A), two (panel B), or three (panel C) silanol groups on the silica gel surface, yielding distinct thiol silica gels and methanol molecules as products.

The selenol silane is then reacted with aqueous silver nitrate in acetonitrile ($H_2O$:ACN, 1:1) to yield a silver(1) propylselenol trimethoxysilane.

DETAILED DESCRIPTION

The compositions, methods, kits and devices herein include a medium including metal that is bonded to a sulfur atom (sulfur-containing functional group) or selenium atom (selenium-containing functional group). Without being limited by any particular theory or mechanism of action, it is here envisioned that systems, methods, compositions and kits include a medium including metal bonded to a sulfur atom or a selenium atom are more effective than a metal bonded to a tellurium atom, or a polonium atom. The metal rather than simply being impregnated in the media is covalently bonded to sulfur or selenium atoms and does not leach from the stationary phase into the mobile phase. Thus, the compositions, methods, kits and devices herein create a substantially permanent, reusable chromatographic medium that can be used to calibrate, discriminate and separate a broad variety of different samples, compounds and analytes, along with their respective analogs and derivatives. For example, the sample, compound or the analyte contains electron rich functional groups such as carbon-carbon double bond (alkenyl group), a carbon-carbon triple bond (alkynyl group), an aromatic system or an amine group.

Carbon-carbon double bonds, commonly found in organic compounds, are not generally targeted for interaction or affinity by chromatographic media. Commercially available media instead target hydroxyl, carbonyl, and other heteroatoms, and molecules having different sizes. Silver has an affinity for double bonds, and has been employed in chromatographic methods, for example in the mobile phase. DelaRoche, J. A. et al. 1971 Lipids 6: 537-540. Unsaturated organic compounds are known to readily complex with transition metals. The resulting complexes are formed by a charge-transfer type of interaction, with the unsaturated compound acting as an electron donor and the transition metals acting as an electron acceptor. See Morris, L. J., 1966 J. Lipid Res. 7: 717-732; Guha, O. K. et al. 1972 J. Chromatogr. 68: 325-343; Ittel, S. D. et al. 1976 Advances of Organometallic Chemistry 14: 1'-61 edited by F. G. A. Stone and R. West, Academic Press, New Ynrk; Kasai, P. H. et al. 1980 J. Am. Chem. Soc. 102: 179-190; and de Ligny, C. L. 1976 Advances in Chromatography 14: 265-304 edited by J. C. Giddings, E. Grushka, J. Cazes & P. R. Brown, Marcel Dekker, New York, each of which is incorporated herein by reference in its entirety.

Chromatographic materials taking advantage of the affinity between metals and carbon-carbon double bounds have in the past primarily involved impregnation of metal ions into the packing material, for example impregnating or imbedding silver ion ($Ag^+$) into a silica gel. See Heath, R. R. et al. 1977 J. Chromatogr. Sci. 15: 10-13; Heath, R. R. et al. 1975 J. Chromatogr. Sci., 13: 380-382; Battaglia, R. et al. 1980 Chromatographia 13: 428-431. Chromatographic methods involving impregnation of silver in silica gel suffer from a number of disadvantages. For example, the silver impregnated into silica gel is not covalently bonded to the silica gel, therefore during separation the silver ion leaches or diffuses into the mobile phase. This characteristic leaching or mobility of the silver ion into the mobile phase results in a lack of reusability of the material. A new column must be prepared for each separation which severely reduces the practicality of the method. Irreproducibility of data is also associated with impregnation because the silver ion is rapidly reduced to silver metal on exposure to light. The reduction of the silver causes the metal to lose its binding capacity and effectiveness. In many cases, $Ag^+$ can also oxidize the compounds of interest when $Ag^+$ is reduced to Ag upon exposure to light, causing structural changes and lower recovery of the target compounds during a chromatographic separation.

Further, while silver ion impregnated silica media are commercially available (Sigma Aldrich, St. Louis, Mo.), these products are very expensive and are only prepared by the supplier after receiving an order so as to take weeks to prepare and to send to the buyer. The leaching or diffusion of silver ion on the column makes the elution peaks broader and decreases the observed resolution, producing a chromatographic profile with elution peaks that are broad and overlapping. Thus, the stationary phases of these media are not actually stationary and in fact leach from the column into the mobile phase. The more polar the elution solvent, the stronger the interaction between the compounds of interest and the silver ion impregnated silica (e.g., for compounds that contain more double bonds), the more likely silver ions can be abducted by the solvent and/or compounds of interest and subsequently leached out of the chromatographic column. Compounds containing aromatic rings, in particular, have a strong tendency to abduct the silver ions during the separation using silver nitrate impregnated silica gel.

Silver impregnated chromatographic materials have been used to separate compounds containing carbon-carbon double bounds, for example alkenones, long-chain (37 to 39 carbon atoms) di-, tri-, and tetra-unsaturated methyl and ethyl ketones produced by algae such as coccolithophorids (D'Andrea, W. et al. 2007 Analytical Chemistry 79: 3430-3435). Alkenones are produced by certain species of Prymnesiophyceae, a class of algae (also known as Haptophyceae).

Prior efforts to analyze climate history have involved isolation of alkenone species in algal species (Huang, Y. et al., 2007 Anal. Chem. 79: 3430-3425), particularly lipids produced by aquatic algae including coccolithophores. The relative proportion of mono-, di-, tri-, and tetra-unsaturated alkenones produced by the algal species is a function of growth temperature, and analysis of alkenones found in ocean sediment cores has been used to investigate past sea surface temperatures. As these lipid compounds are produced by algae, the isotope ratios of the alkenones, for example hydrogen isotope ratios, reflects the isotope ratios of the source water and the ratios are used to determine conditions in ancient bodies of water. However these methods in the past used silver nitrate impregnated silica gel to separate alkenones, a method having drawbacks and limitations, including lack of reproducibility due to broad chromatographic peaks, un-reusable columns and instability of the stationary phase.

Figure 12:
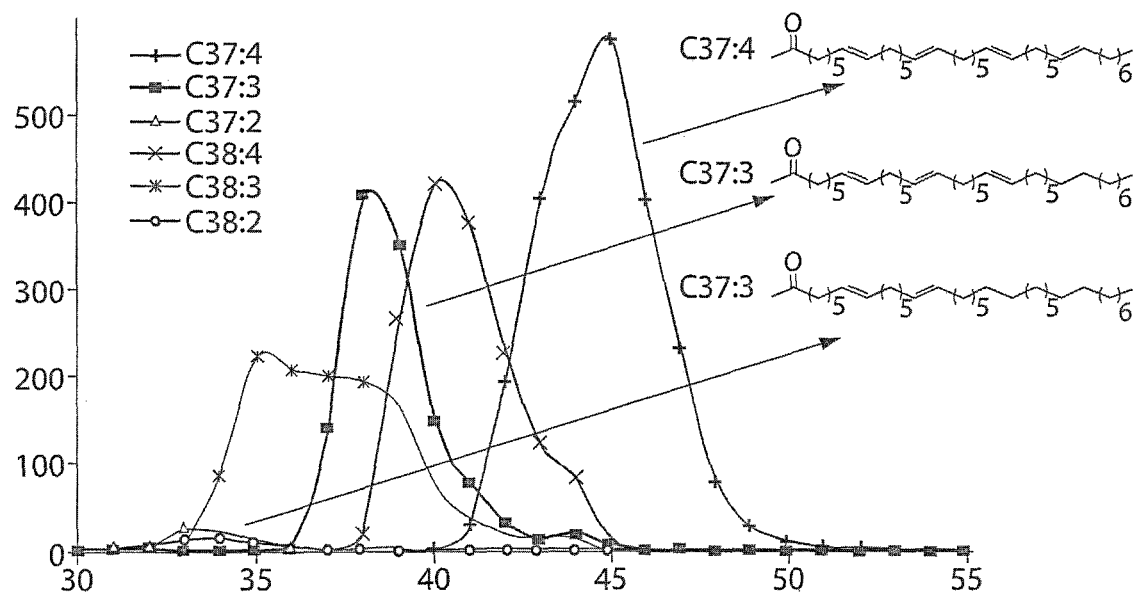
FIG. 12 is a graph showing data obtained by chromatographic separation of di-, tri, and tetra-unsaturated $C_{37}$ and $C_{38}$ alkenones (six compounds) from a sediment sample (Brava So, Greenland) using a silver thiolate silica gel pipette column. The data show that the silver thiolate pipette column eluted each of the di-, tri-, and tetra-unsaturated $C_{37}$ and $C_{38}$ alkenones. Data show distinct elution peaks for the di-unsaturated (C37:2; triangles), tri-unsaturated (C37:3; squares), and tetra-unsaturated (C37:4; diamonds) $C_{37}$ alkenones. The di-unsaturated (C38:2; circles), tri-unsaturated (C38:3; asterisks), and tetra-unsaturated (C38:4; -x-) $C_{38}$ alkenones were separated into partially overlapping peaks. These compounds are produced by lacustrine haptophyte algae.

Examples herein describe methods and compositions for silver chromatography that eliminate the problems of instability and mobility of the $Ag^+$ ion during chromatographic separations. The chromatographic media herein can be used for many kinds of liquid chromatographic methods including conventional liquid chromatography, HPLC, thin layer chromatography (TLC). An example of using an HPLC column composed of MTCM stationary phase for the separation of unsaturated ketones is shown in FIG. 12. The columns used can be repeatedly used for this type of separation and maintains the same retention times for these compounds. The silver-thiolate chromatographic media used for example in FIG. 9 panel A was repeatedly tested over a thirty day period of time, and showed no loss of alkene-retention and no change of retention times. The separation is thus highly reproducible. The MTCM can be safely kept at room temperature or at 60° C. with no appreciable physical signs of decomposition or degradation, such as a change in coloration, smell or complexion.

An aspect of the invention provides a metal-thiolate chromatographic medium (MTCM) including a sulfur-containing functional group, or a metal-selenolate chromatographic medium (MSCM) including a selenium-containing functional group covalently attached to a support medium covalently attached to the support medium, such that the sulfur-containing functional group or selenium-containing functional group is covalently bonded to an atom of a transition metal, such that the MTCM or the MSCM has affinity and specificity to bind a compound comprising a carbon-carbon double bond or other electron rich functional groups. The phrase "metal selenolate chromatographic medium" is used interchangeable herein with the phrase "metal selenol-mercaptide chromatographic medium".

Methods, compositions and kits herein take advantage of a method for preparing thiol propyl-functionalized silica gel (Wasiak, W. 1987 Chromatographia 23: 423-426). Notably, thiol-functionalized silica gel has not been prepared for chromatographic purposes, but has been used for scavenging metal ions from aqueous solutions. Several manufacturers supply thiol-functionalized silica gel (for example, Silicycle; Quebec, Canada). Most manufacturers do not use chromatographic grade silica gel in order to reduce the cost of production, hence directly purchased thiol-functionalized silica gel may not meet the requirement for liquid chromatography. Examples herein used high grade chromatographic silica gel, performed modifications including thiol- and propyl-thiol-functionalization, and monitored sulfur content in products carefully to arrive at an optimal condition for making thiol-functionalized silica gel. Methods and procedures were developed to quantitatively bond silver ion ($Ag^+$) onto the thiol-functionalized silica gel. Because silver was covalently bonded onto the thiol (S) to form —S—Ag bond (which is a polar covalent bond), silver was completely stabilized towards light exposure and immobilized during chromatographic separations.

Materials and methods herein involve covalently binding metals to other atoms including selenium, which produces MSCM for effective separation of compounds and molecules having carbon-carbon double bonds or other electron-rich functional groups. Organoselenium compounds in various embodiments form a more stable complex with silver (I) than organosulfur compounds (Pettit, L. D. et. al 1967 Chem. Commun. 1179-1180, which is incorporated herein by reference in its entirety). Methods are provided herein for producing MSCM for separating and identifying compounds. Systems, compositions, devices, methods and kits using MSCM are also provided herein.

The covalently bonded silver has completely defied conventional wisdom that only silver ion ($Ag^+$) will have the effect of interacting with high electron density regions of an organic compound. Data herein shows little or no loss of affinity of covalently bond silver toward double bonds and other electron rich moieties in organic compounds, and at the same time, completely eliminating the two major drawbacks of the silver ion liquid chromatography, instability and poor chromatographic resolution.

Examples herein chemically attach a metal or metal ion to a thiol-functionalized or selenolate-functionalized silica gel, to obtain gels that effectively separate organic compounds having different degrees of unsaturation. The solubility product of a covalently boned silver and thiol group is ~$10^{-34}$, a value indicating that the covalent bond between the silver and the thiol is extremely stable. This enhanced stability reduces or even eliminates the leaching characteristic of prior impregnated metal materials.

Examples herein have also shown the effectiveness of copper. It is envisioned that in addition to silver and copper, other metals such as transition metals are useful for the chromatographic media herein and for methods of making them, for example gold ($Au^+$), cadmium ($Cd^{2+}$) and zinc ($Zn^{2+}$). These elements share a common feature: each has a full $d^{10}$ electronic configuration, which has been thought to yield significant interactions with double bonds (Dean., P. et al. 1993 Rapid Commun. Mass Spectrom. 7: 53-57). These metals may demonstrate different chemical properties and degrees of affinity to different organic compounds with double bonds.

The methods and resulting chromatographic media containing an appropriate choice of metals are selected as useful for separating different compound mixtures found in nature such as biological samples and environmental samples. It is important to note that this is the first time that a liquid chromatographic medium contains metals. These metal-containing media are used individually or as a plurality of metal-containing media (or with unmodified media), mixed in appropriate ratios to obtain a variety of affinity, separatory and retentive properties appropriate to the type of organic compounds in a sample. The amount of each covalently attached metal to the stationary phase support medium, for example, silica gel, is optimized to afford the optimal separation of the desired compound class or classes, for example alkenes, aromatic hydrocarbons, aliphatic hydrocarbons, steroids, terpenoids, glycerides, phthalates, chlorophylls, pigments, lipids, proteins, amino acids, nucleic acids, sugars, carbohydrates and alkenones.

Examples herein show that the alkyl-sulfur-metal silica gel media or the alkyl-selenium-metal silica gel medium provided herein effectively separated a wide range of otherwise difficult to separate organic molecules and their derivatives and analogs, including for example sterols, polyaromatic hydrocarbons, triglycerides, alkenes (olefins), alkanes, and alkenones, and inorganic compounds. Hydrocarbons and polyaromatic hydrocarbons for example are byproducts of fossil fuel, charcoal and wood combustion, and are important for environmental studies and in exploration studies by the petroleum industry and other energy-interested concerns. Triglycerides are constituents of oils and fats, and are very important components in the food industry. The medical field is also increasingly interested in determining the number and kinds of triglycerides found in patient biological samples. Phthalates are esters of phthalic acid and are mainly used as plasticizers which are substances added to plastics to increase flexibility, transparency, durability, and longevity of the plastics. Phthalate contamination of the environment has been observed to be widespread, and requires assays for monitoring extent of these compounds in various parts of the environment, for example, hospitals and nurseries. Phthalates have been found to damage male reproductive systems and many procedures have been developed to concentrate and analyze phthalates in milk and human urine samples. The MTCM or MSCM are used in various embodiments in a SPE device to pre-concentrate the phthalates in these samples, and subsequently, these compounds can be analyzed using HPLC-MS using an HPLC column.

Other molecules requiring purification and analysis which of interest in medicine and environmental areas include: sterols which are naturally-occurring multi-carbon ring molecules that are components of membranes, and are especially important for development of animals, plants and fungi; alkenones which are naturally-occurring substances produced by phytoplankton and are analyzed for example to quantify past water and climate temperatures. Alkanes are molecules containing only hydrogen and carbon; alkenes which are a wide range of molecules with one or more carbon-carbon double bonds including many of the molecules which are utilized and studied by the petroleum industry. The chromatographic compositions, methods, kits, and devices herein are useful for purification, isolation, and analysis of a wide range of organic molecules, and are not limited to those listed herein, and include also biological polymers such as carbohydrates, nucleic acids and proteins, and monomeric components such as sugars, amino acids, lipids, and include also synthetic polymers and monomeric components.

These organic molecules and derivatives include a wide range of structural characteristics including without limitation: number of carbon atoms and length; number and location of carbon-carbon double bonds (i.e., degree and position of unsaturation); hydrophobicity and hydrophilicity; aromaticity; number and position of heteroatoms; isomerism, such as branched- and straight-chained and location of branch; and stereoisomerism, of increasing importance to the pharmaceutical industry.

These structural characteristics of organic molecules and inorganic molecules differ in affinities and specificities to alkyl-sulfur-metal chromatographic media provided herein, which are consequently useful for purification and analysis. These media retain the different molecules (or fail to retain a portion), hence the affinity separations depend of ability of various solvent systems to elute and analyze and recover the desired target compounds at different times relative to impurities and other undesired molecules found in natural samples and synthetic mixtures.

The chromatographic materials provided in examples herein are useful for a variety of products, and have wide application in different applications of organic chemistry such as environmental and pharmaceutical areas both for analytical and preparative chromatography. The metal-thiolate chromatographic media are useful in solid phase extraction tubes (SPE), and in HPLC columns. The SPE tubes are used widely for rapid, manual or automated separation of compound classes for example molecules with different positions of carbon-carbon double bonds, rapid and sharp isolation of aromatic compounds from non-aromatic hydrocarbons and the like. The media provided herein are suitable for HPLC columns and are useful for chromatographic resolution of organic compounds bearing double bonds, and long chain aliphatic compounds. Resolution and speed of normal-phase and reversed-phase HPLC are improved by use of the media prepared by methods herein compared to prior normal-phase media that afford only limited separation of most organic compounds.

Chromatography is characterized by differing relative polarities of the mobile (liquid) and stationary (packing material) phases. Normal-phase chromatography involves a polar stationary phase, such as silanol on silica, and a relatively non-polar mobile phase, e.g., hexane and dichloromethane. Reversed-phase chromatography involves a non-polar stationary phase, often a hydrocarbon, and the mobile phase is relatively polar, e.g., water, methanol or acetonitrile. Generally in normal-phase chromatography, the least polar sample component is eluted first because it is most soluble in the non-polar mobile phase. Conversely, in reversed-phase chromatography, the most polar sample component is eluted first because it is most soluble in the polar mobile phase.

Examples herein used an MTCM or MSCM which is a silver imbedded silica gel for reversed-phase chromatography separations. The procedures for making $C_{18}$ reversed-phase silica gel include imbedding the silver onto the silica gel thiol (3% to 5% surface coverage), and then covering the silica gel surface with $C_{18}$ alkyl chain molecules. More than 90% of pharmaceutical chromatographic separations are performed using reserved-phase chromatography. Silver imbedded silica gels as described herein have a major application in reversed-phase chromatography and thin layer chromatography (TLC). The methods and compositions herein would replace the earlier method of TLC that mixes silver nitrate with silica gel without chemical bonding. The methods herein overcome shortcomings of the traditional silver nitrate TLC.

The term "spacer", as used herein refers to a chemical moiety used in chemistry synthesis to influence chemical properties, for example reaction conditions, molecule stability, steric hindrance, and hydrophobicity. A spacer for example is an alkyl group situated between a plurality of atoms or functional groups, such that the carbons atoms create additional space between the plurality of atoms or functional groups, thus reducing repulsive interaction (i.e., steric hindrance) between the plurality of atoms and functions groups. The term spacer is used herein interchangeably with the term "linker".

The phrase "sulfur-containing functional group", as used herein refers to a molecule or compound which has a molecular or compound structure that contains a sulfur atom or sulfur atom moiety. The sulfur atom or moiety for example may have been attached by reaction with a functional group such as a thiol, a sulfide, and a disulfide. An exemplary "sulfur-containing functional group" is a thiol, however other sulfur containing functional groups are within the scope of the composition of the chromatographic media provided herein.

The phrase "selenium-containing functional group", as used herein refers to a molecule or compound which has a molecular or compound structure that contains a selenium atom or selenium atom moiety. The selenium atom or moiety for example may have been attached by reaction with a functional group such as selenide, a selenol, or a selenolate.

The term "derivative", as used herein refers to a chemically related form of a molecule or a compound having an additional substituent, for example, a different functional group or atom attached to an atom of the molecule.

The term "analog", as used herein refers to a chemically related form of a molecule or a compound having a different configuration, for example, an isomer, or a D-configuration rather than an L-configuration, or an molecule with the approximate size and shape of the molecule, or a molecule with modification to the atoms that are involved in a chemical bond, including for example to confer resistance to or to facilitate degradation, cleavage, addition, removal, and substitution.

Examples herein show preparing thiol or selenolate silica gels functionalized with metals, and the exemplary media have a variety of linkers or spacers for attachment to the silica gel, for example a propyl (three carbons, n=3) group separating the thiol and metal or the selenium and metal respectively. The length of the aliphatic carbon chain alters the affinity properties of the silica. Accordingly, examples herein synthesize different functionalized silica gels by using as starting materials different carbon spacer lengths, e.g., spacers having from 1 to 18 carbons. Possible spacers include alkyl and aryl structures and include heteroatoms and functional groups bonded to the carbon chains, for example oxygen, nitrogen, phosphorus, nitrile groups, di-thiol groups, thioester groups, carbonyl groups, and hydroxyl groups.

The invention now having been fully described is exemplified by the following examples and claims, which are exemplary and are not to be construed as further limiting. The contents of all references cited are hereby incorporated herein by reference.

EXAMPLES

Example 1

Method for Preparation of Thiol-propyl Silica Gels

Silica gel was activated overnight at 150° C. degrees. A portion (10 g) was suspended in 50 mL of m-xylene and 15 mL (84 mmol) of 3-mercaptopropyltrimethoxysilane (MPTS) was added dropwise with stirring. The solution was then flushed with Argon gas and the system was closed to keep it under inert-dry conditions. Mercaptopropyltrimethoxysilane is commercially available from Gelest, Inc. (Morrisville, Pa.). The solution was taken to reflux and stirred for 72 hours. The silica was cooled, filtered and was exhaustively washed with m-xylene, acetone, water and methanol, and dried at 60° C. overnight. An alternative method of drying the modified silica includes drying at 25° C. under vacuum (~$10^{-3}$ torr) for 72 hours.

Examples herein shown that a mercaptopropylsilane moiety bonds one, two or three silanol groups from the silica gel surface (FIG. 1 panels A-C), although the majority of the products observed are envisioned to be the product formed by mercaptopropylsilane bonding to two silanol units (FIG. 1 panel B).

Example 2

Method for Preparation of Propyl-sulfur-silver Silica Gels

Figure 2:
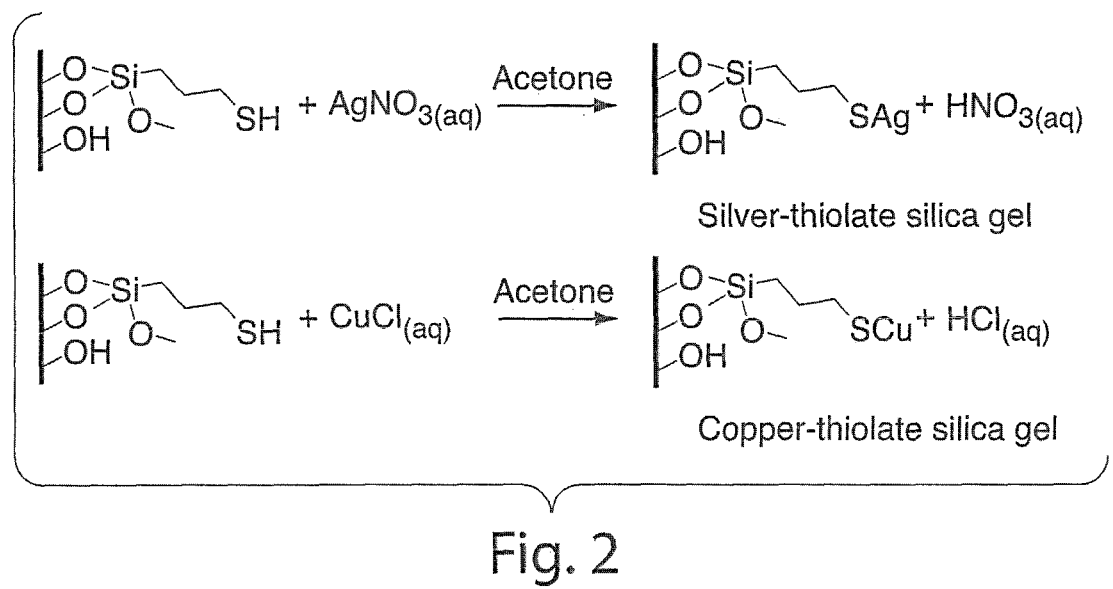
FIG. 2 is a drawing showing a chemical reaction of a thiol silica gel having two silanol groups on the silica gel surface, reacting with aqueous silver nitrate, top row, or aqueous copper(I) chloride, bottom row, (acetone used to wash the material) in methanol to yield a silver-thiolate or copper(I)-thiolate silica gel and nitric acid or hydrochloric acid.

Thiol silica gel was mixed in different proportions with a silver salt to prepare a silica gel containing a sulfur-silver complex (FIG. 2 top row). Four parts of thiol silica gel were mixed with one part of silver nitrate dissolved in 0.1 M nitric acid ($HNO_3$). The 4 to 1 ratio (by measuring 20% by weight of silver nitrate of the weight of the 40 micron to 60 micron particle size silica gel) produced the complete saturation and replacement of the thiol functionalities by the sulfur-silver complex. For smaller silica gel particle sizes with larger surface areas, greater amount of silver nitrate may be needed to fully saturate the silica gel. To enhance the stability of the silver ions in the solution and to avoid reduction of $Ag^+$ into Ag (which darkens the product slightly), small amounts of nitric acid ($HNO_3$) was added to the reaction mixture to maintain the nitric acid concentration to greater than 0.5M. Reaction glassware was covered with aluminum foil. After mixing, the suspension was sonicated for three minutes and then the silica was filtered and exhaustively washed with water and acetone. The mixture was dried at 60° C. overnight. Alternatively, the modified silica is dried at 25° C. under vacuum (~$10^{-3}$ torr) for 72 hours (FIG. 2).

Thiol silica gel was mixed in different proportions with a copper salt to prepare a silica gel containing a sulfur-copper complex (FIG. 2 bottom row).

The silica gel was chemically bonded to the silver, and the product displayed a slight yellowish color that did not change upon exposure to light. This observation contrasts to silica gels impregnated with silver nitrate that darken rapidly (e.g., within hours) when exposed to light because of reduction of $Ag^+$ to $Ag^0$.

Examples herein show also that using different loading ratios and percentages of the silver salt yielded sulfur-silver silica gel preparations that have different chromatographic properties, e.g., lower percentages of silver loading resulted in gels characterized by lower retention of compounds that have double bonds. Chromatographic materials having reduced retention of carbon-carbon double bounds (alkenyl groups) are useful and needed for separating highly unsaturated compound moieties such as polycyclic aromatic hydrocarbons.

Example 3

Figure 3:
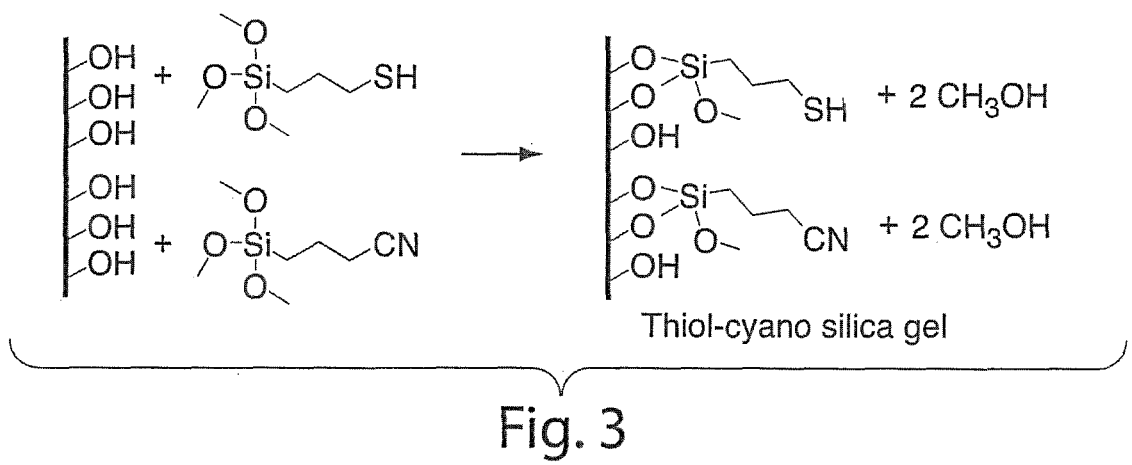
FIG. 3 is a drawing showing a chemical reaction of a silica gel reacting with 3-mercaptopropyltrimethoxysilane and 3-cyanopropyltrimethoxysilane to yield a thiol-cyano-silica gel and methanol.

Method for Preparation of Chromatographic Gels having Varied Percentages of Thiol-propyl Silica Gels and Cyano-propyl Silica Gels To a suspension of activated silica gel (10 g) in 50 mL of m-xylene, 7.5 mL of 3-mercaptopropyltrimethoxysilane (MPTS) and 7.5 mL of 3-cyanopropyltrimethoxysilane (CPTS) (50%-50%) were added dropwise with stirring, then the solution was flushed with Argon gas and the system was closed to maintain inert-dry conditions (FIG. 3). CPTS was obtained from Gelest, Inc. (Morrisville, Pa.). The solution was refluxed with stirring for 72 hours. After cooling, the silica was filtered, and was exhaustively washed with m-xylene, acetone, water and methanol, and dried at 60° C. overnight. Alternatively the modified silica is dried at 25° C. under vacuum (~$10^{-3}$ torr) for 72 hours.

The ratio of MPTS to CPTS was varied in examples herein to obtain a set of modified silica gels containing different percentages of the thiol and the cyano-propyl groups. The thiol and cyanide modified silica gel were then characterized by use in each of normal-phase and reversed-phase liquid chromatography.

Example 4

Figure 4:
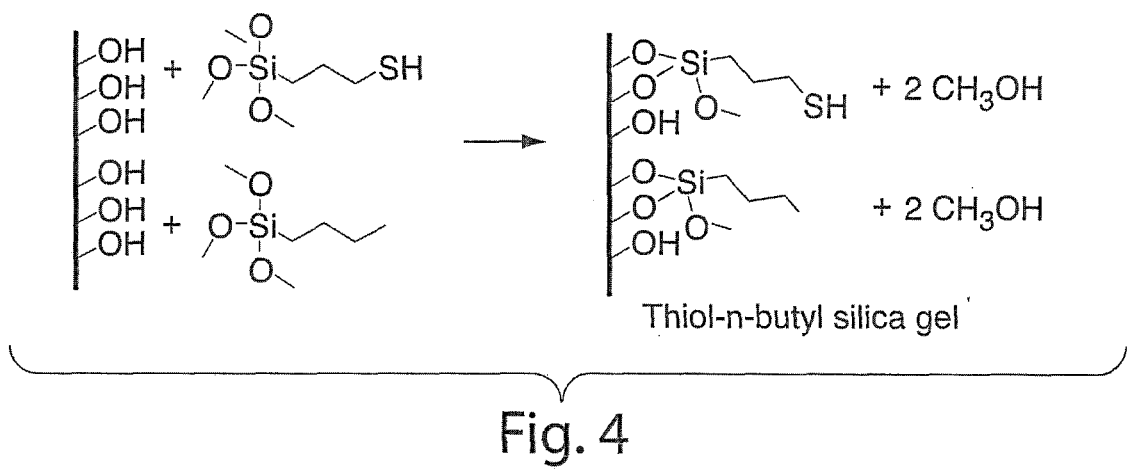
FIG. 4 is a drawing showing a chemical reaction of a silica gel reacting with 3-mercaptopropyltrimethoxysilane and n-butyltrimethoxysilane to yield a n-butyl silica gel and a thiol-n-propyl silica gel, respectively, on the substrate and methanol.

Method for Preparation of Chromatographic Gels having Varied Percentages of Thiol n-butyl and Thiol n-propyl Silica Gels To a suspension of activated silica gel (10 g) in 50 mL of m-xylene, 7.5 mL of MPTS and 7.5 mL of n-butyltrimethoxysilane (BTS) were added dropwise with stirring (50%-50%), then the solution was flushed with Argon gas and the system was closed to maintain inert-dry conditions. BTS was obtained from Gelest, Inc. (Morrisville, Pa.). The solution was refluxed with stirring for 72 hours. After cooling, the silica was filtered, exhaustively washed with m-xylene, acetone, water and methanol, and was dried at 60° C. overnight (FIG. 4). Alternatively the modified silica is dried at 25° C. under vacuum (~$10^{-3}$ torr) for 72 hours. The ratio of MPTS to CPTS was varied to obtain modified silica gels containing different percentage compositions of thiol and n-butyl groups. The modified silica gels were used in reversed-phase liquid chromatography.

Example 5

Method for Preparation of Diol and Thiol-alcohol Silica Gels

Figure 5:
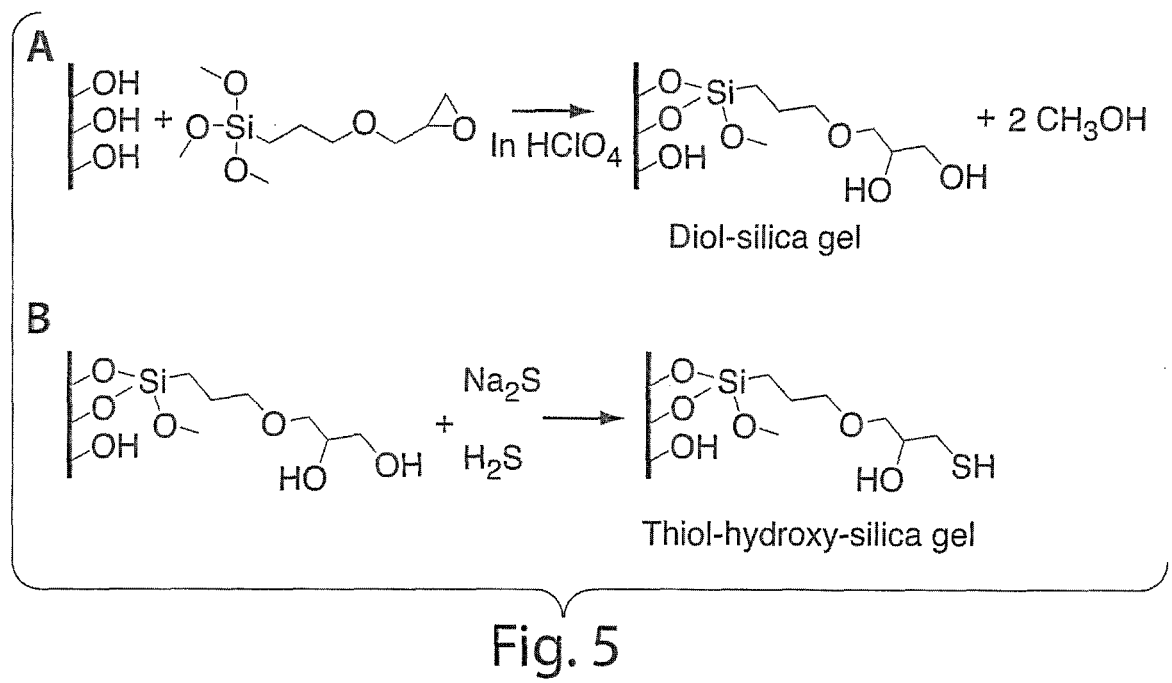
FIG. 5 is a set of drawings showing chemical reactions for preparing a diol silica gel (panel A) and a thiol-hydroxy silica gel (panel B).

Silica gel was suspended in an aqueous solution to which perchloric acid was added to obtain pH 3.5, the solution containing GPTS (FIG. 5 panel A). This suspension was refluxed for five hours and after cooling, the suspension was exhaustively washed with water and methanol and was dried at 60° C. overnight. Alternatively the modified silica is dried at 25° C. under vacuum (~$10^{-3}$ torr) for 72 hours. GPTS was obtained from Alfa Aesar (Ward Hill, Mass.). The diol-silica gel was reacted with sodium sulfide and hydrogen sulfide in methanol to produce a thiol-hydroxy silica gel (FIG. 5 panel B).

Figure 6:
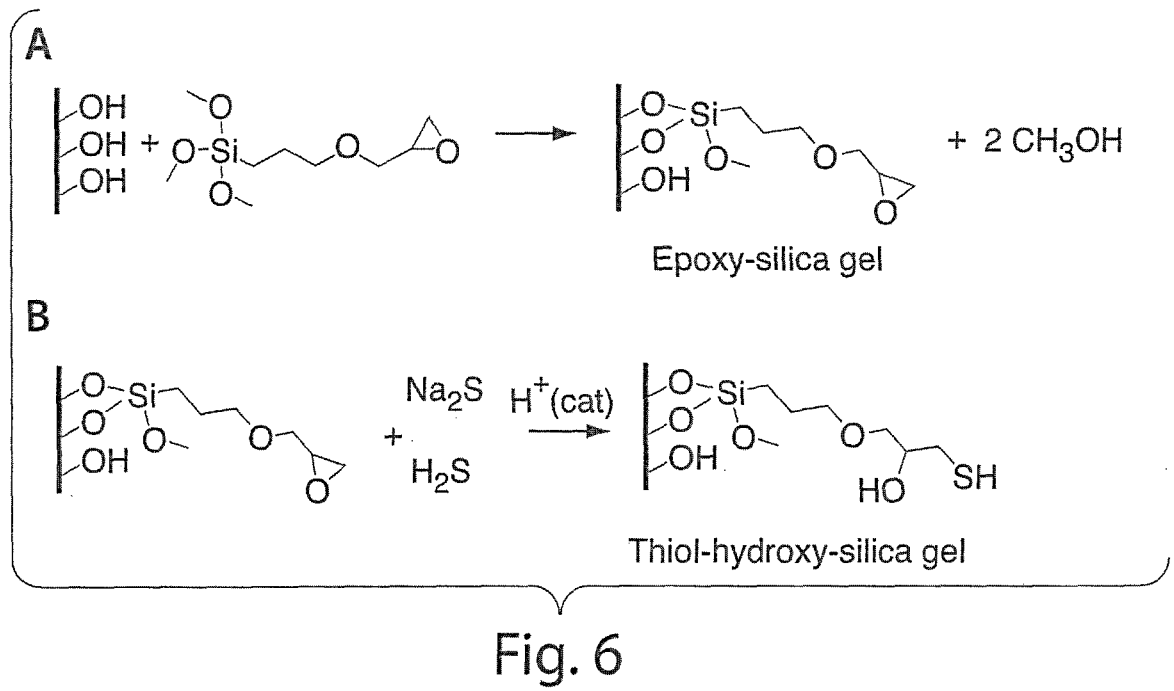
FIG. 6 is a set of drawings showing reactions for preparing an epoxy-silica gel and thiol-alcohol silica gel.

Examples herein show alternative methods of synthesis using commercially available epoxy silica gel to produce the thiol-hydroxy silica gel. Epoxy-silica gel was prepared by mixing activated silica gel and GPTS in xylene, flushing the suspension with Argon gas, and maintaining the system closed under inert-dry conditions (FIG. 6 panel A). The solution was refluxed with stirring for 72 hours. After cooling, the silica was filtered, exhaustively washed with m-xylene, acetone, water and methanol, and was dried at 60° C. overnight. The epoxy silica gel was reacted with sodium sulfide and hydrogen sulfide in the presence of an acid catalyst in methanol to produce a thiol-hydroxy silica gel (FIG. 6 panel B). This modified silica gel was used in normal-phase liquid chromatography.

Example 6

Method for of Varied Percentages of Thiol-propyl and Hydroxyl-propyl Silica Gels To a suspension of activated silica gel (10 g) in 50 mL of m-xylene, 7.5 mL MPTS and 7.5 mL of 3-hydroxypropyl-trimethoxysilane (HPTS) were added dropwise with stirring (50%-50%), then the solution was flushed with Argon gas and the system was closed to keep it under inert-dry conditions. HPTS was obtained from Alfa Aesar (Ward Hill, Mass.).

Figure 7:
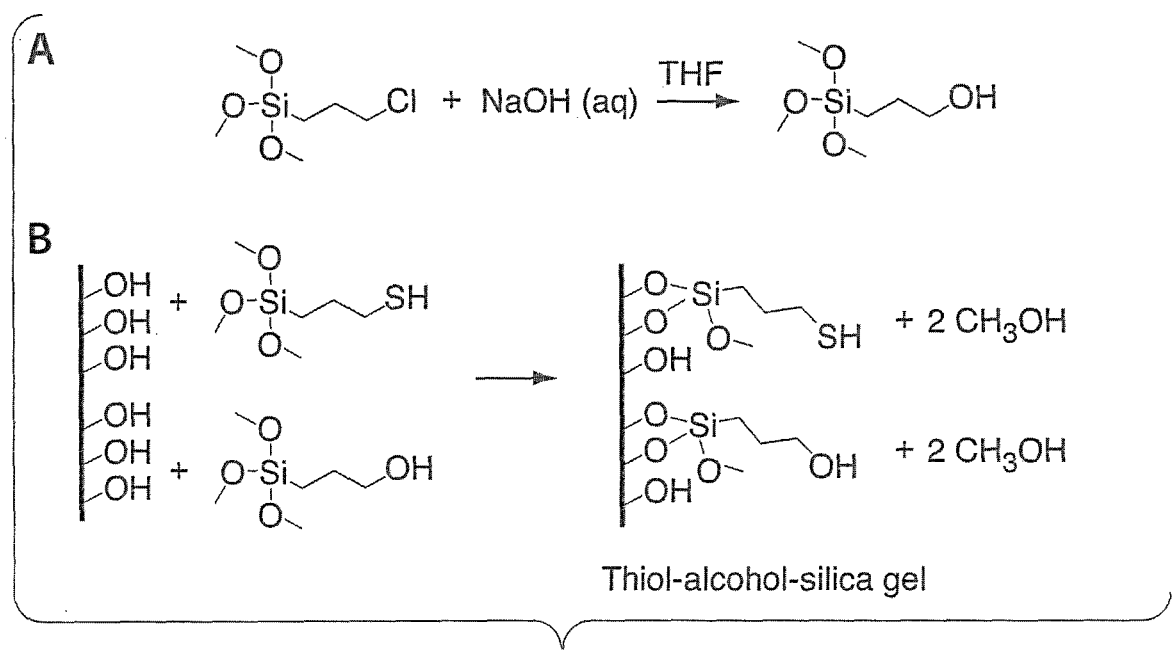
FIG. 7 is a set of drawings showing reactions for preparing propyl-thiol and propyl-hydroxy silica gels.

The solution was refluxed with stirring for 72 hours. After cooling, the silica was filtered, exhaustively washed with m-xylene, acetone, water and methanol and was dried at 60° C. overnight. Alternatively the modified silica is dried at 25° C. under vacuum (~$10^{-3}$ torr) for 72 hours. The ratio of MPTS to HPTS was varied to obtain a set of modified silica gels containing different percentages of thiol and hydroxy propyl groups (FIG. 7).

The modified silica gels described herein were used for normal-phase chromatography with silver covalently bonded to the thiol chemically bonded to the silica gel stationary phase.

Figure 8:
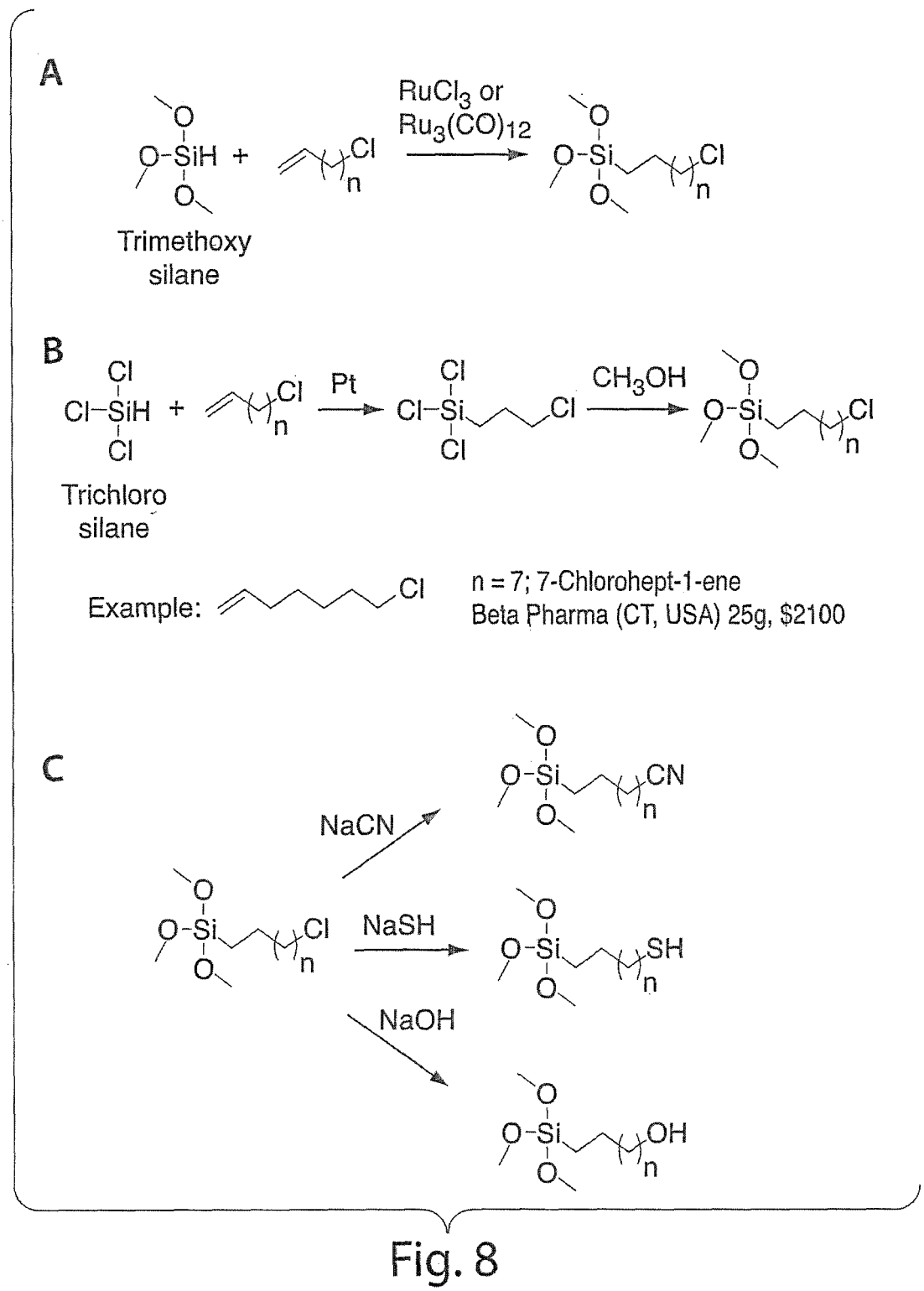
FIG. 8 is a set of drawings showing alternative reaction pathways for preparing thiol silica gels having different carbon chain lengths.

An alternative method herein is the reaction of trimethoxysilane with an allyl-terminal alkene chloride in the presence of a ruthenium catalyst (FIG. 8 panel A). The alternative method is a two step synthesis, which involves the reaction of trichlorosilane and the alkene chloride in the presence of a platinum catalyst and then the replacement of the chlorine substituents by methoxy groups (FIG. 8 panel B). For example, the allyl-terminal alkene chloride is 7-chlorohept-1-ene (n=7), which was obtained from Beta Pharma Inc.

(New Haven, Conn.). This reagent used in the reactions herein yielded a 7-chloroheptyl trimethoxysilane, which was then modified for reactions with silica gel (FIG. 8 panel C).

Example 7

Mixing Commercial Silica Gels and Products of Methods Herein

Silver bonded silica gels having different amounts of Ag were prepared by physically mixing the product from Example 2 above commercially available normal-phase and reversed-phase silica gel of the same particle size. The resulting mixed silica gel preparations have a range of useful chromatographic properties in addition to the silica gels produced by the methods in Examples 3 to 6. Further, cost associated with making this range of silica gels is reduced. For applications such as solid phase extractions and bulk separations, a mixed silica is sufficient to be effective. For HPLC applications, it is envisioned that a smaller particle size silica (e.g., 1.8 micron) is generally more effective for chromatographic separation than a larger particle size, e.g., 5 micron silica.

Example 8

Separation of Saturated and Un-saturated $C_{14}$ Compounds Using Pipette Columns Containing Alkyl-thiol-silver Silica Gel Material The alkyl-thiol-silver silica gel prepared by the methods herein was observed to be more effective for chromatographically separating saturated and multi-unsaturated organic compounds compared to each of normal unmodified silica gel and commercially available 10% silver nitrate silica gel as shown in examples herein.

Alkyl-thiol-silver (alkyl-sulfur-silver) silica gel medium (20% w/w) were prepared as described herein and columns of this material and each control media were prepared. A solution containing a mixture of saturated, mono-unsaturated, di-unsaturated, and tetra-unsaturated $C_{14}$ compounds was loaded onto each column. Elution buffer was added to the column and elutes were collected for a time period of 60 fractions. The compounds were identified by gas chromatography and mass spectrometry.

Figure 9:
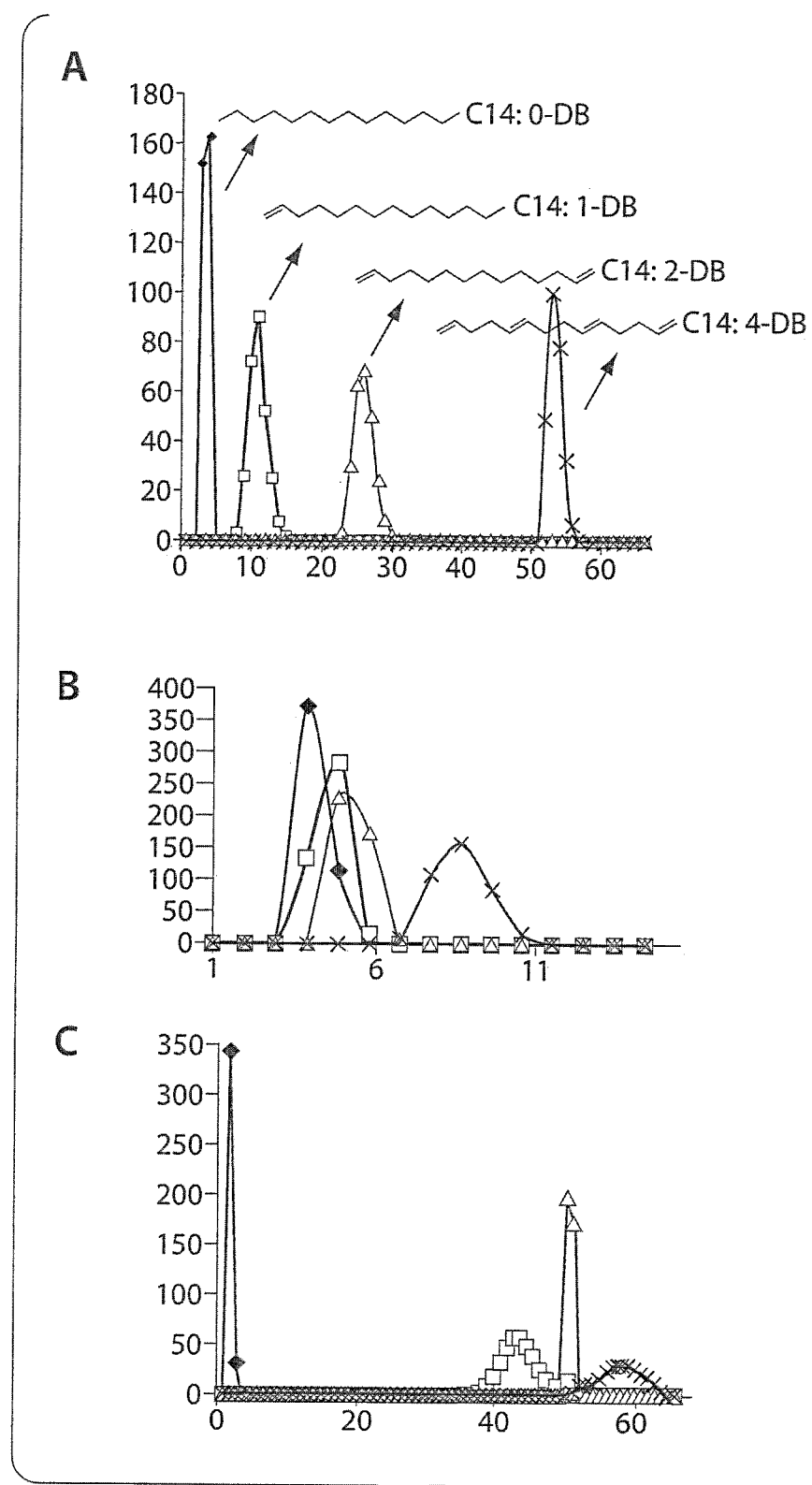
FIG. 9 is a set of analytical elution schemes showing chromatographic separations of commercially available saturated and unsaturated molecules having 14 carbon atoms using pipette columns containing each of a silver thiolate modified silica gel (20% w/w), a normal unmodified silica as a control, and commercially available (Sigma Aldrich) 10% silver nitrate silica gel (silver ion silica gel). The carbon molecules shown are fully saturated (diamonds) and each of mono-unsaturated (squares), di-unsaturated (triangles), and tetra-unsaturated (-x-) $C_{14}$ compounds.

Data in FIG. 9 show that the compounds were more effectively separated into fractions displaying discrete peaks using the alkyl-thiol-silver silica gel material (FIG. 9 panel A) compared to compounds separated using normal unmodified silica gel (FIG. 9 panel B) or the commercially available impregnated 10% silver nitrate silica gel (FIG. 9 panel C). The compounds were eluted in the following order from the thiol-silver silica gel: saturated $C_{14}$ compound, mono-unsaturated $C_{14}$ compound, di-unsaturated $C_{14}$ compound and tetra-unsaturated $C_{14}$ compound (FIG. 9 panel A). The peaks observed for the thiol-silver silica gel were sharp and well separated from each other by fractions containing none of these compounds, compared to the control media, viz., the unmodified silica gel and the impregnated silver silica gels (FIG. 9 panels B and C).

The thiol-silver modified silica gel was determined to have excellent stability and reusability after storage at room temperature in ambient light; in fact similar chromatographic results to those in FIG. 9 panel A were observed upon reuse, even after regenerating and reusing the column five times during one month. In contrast, the commercially available silver impregnated column in which silver was not covalently attached, used as a control to obtain the data in FIG. 9 panel C, was observed to not be reusable as it produced irreproducible results upon retesting in subsequent days. It was further observed also that the users of the covalently attached silver medium produced by the methods herein did not later report stained fingers or other skin areas, compared to users of the commercial silver impregnated column who observed such staining.

Thus, the covalently bound alkyl-thiol-silver silica gel effectively separated saturated and mono-unsaturated and multi-unsaturated organic compounds. Additional metals were covalently attached to chromatographic media in examples herein and used for separations, and the data showed that those materials and methods were also effective in separating these compounds.

Example 9

Separation of Saturated and Un-saturated $C_{14}$ Compounds Using Pipette Columns Alky-thiol-metal Silica Gels To investigate whether other metals covalently bound to alkyl-thiol-silica gels in addition to silver ($Ag^+$) were effective in chromatographically separating organic molecules, alkyl-thiol-copper-silica gel materials, alkyl-thiol-nickel-silica gel materials, and alkyl-mercury-silica gel materials, were each prepared. These chromatographic materials were loaded onto pipette columns and were tested for ability to separate organic compounds having double C—C bonds and unsaturated compounds.

Figure 10:
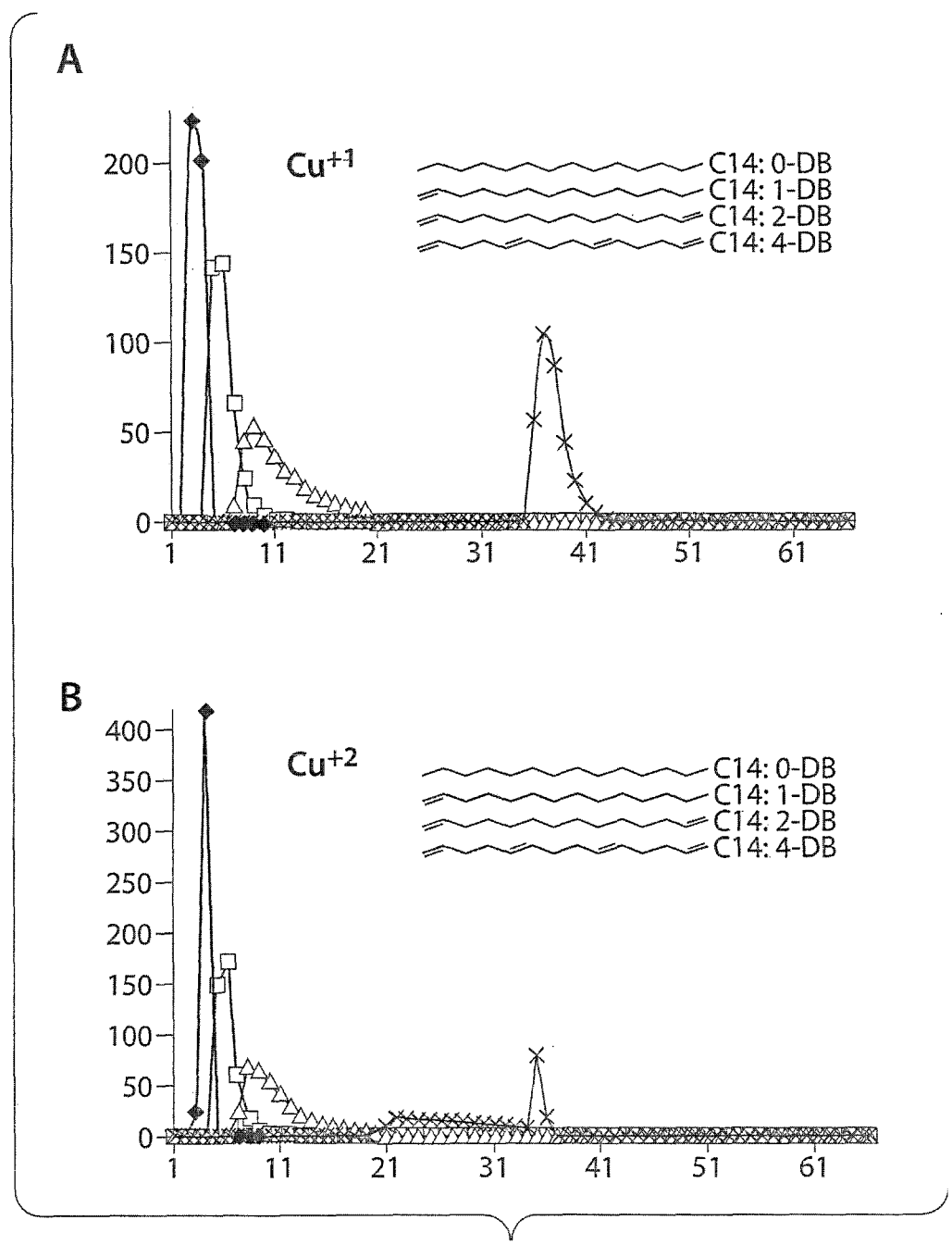
FIG. 10 is a set of traces showing elution data obtained from the chromatography of commercially available fully saturated (diamonds) $C_{14}$ compounds and unsaturated compounds mono-(squares), di-(triangles), and tetra-(-x-) $C_{14}$ compounds using pipette columns containing metal thiolate silica gel media: copper ($Cu^{+1}$, panel A; and $Cu^{+2}$, panel B), nickel ($Ni^{+2}$, panel C), and mercury ($Hg^{+2}$, panel D), respectively.
Figure 10:
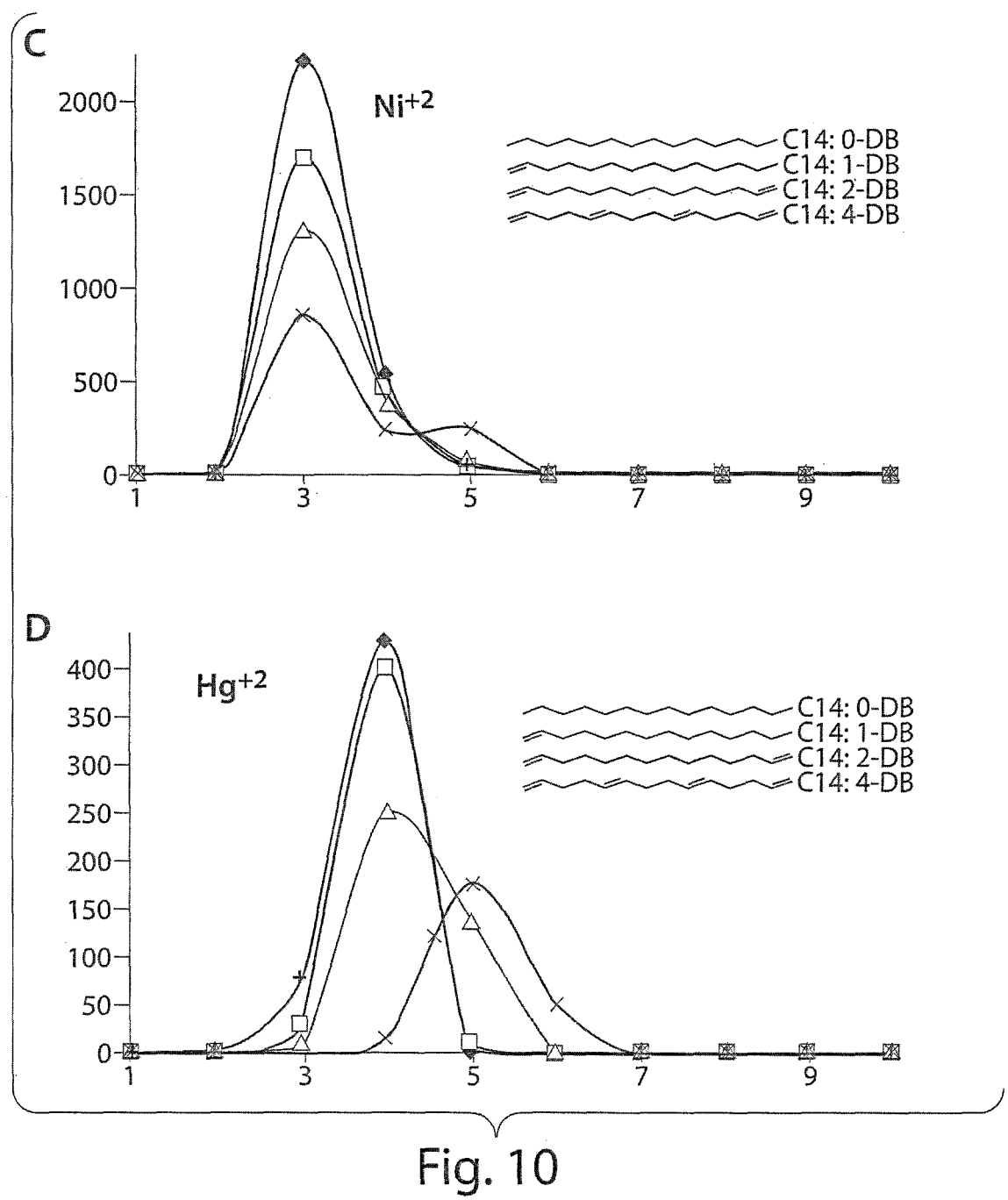

Alkyl-sulfur-metal- silica gels were prepared as described herein and a column of each medium was prepared. The metals covalently bound to the alkyl-thiol silica gels were each of copper ($Cu^{1+}$ and $Cu^{2+}$ respectively), nickel ($Ni^{2+}$), and mercury ($Hg^{2+}$). A solution containing a mixture of saturated, mono-unsaturated, di-unsaturated, and tetra-unsaturated $C_{14}$ compounds was loaded onto each column. Elution buffer was added to the column and elutates were collected for a time period of 60 fractions. The compounds were identified by gas chromatography and mass spectrometry (FIG. 10).

Data show that each of the columns containing alkyl-thiol-copper silica gels ($Cu^{+1}$ or $Cu^{+2}$) more effectively separated the saturated and unsaturated compounds compared to the alkyl-thiol-nickel-silica gel medium and alkyl-thiol-mercury-silica gel medium. The compounds eluted from the thiol-silver silica gel in the following order: saturated $C_{14}$ compound, mono-unsaturated $C_{14}$ compound, di-unsaturated $C_{14}$ compound and tetra-unsaturated $C_{14}$ compound (FIG. 10 panel A). These chromatograms were comparable to the chromatograms obtained by separation of the saturated and unsaturated $C_{14}$ compounds by the alkyl-thiol-silver-silica gel medium (FIG. 9 panel A and FIG. 10 panel A). The alkyl-thiol-nickel-silica gel medium and the alkyl-thiol-mercury-silica gel medium were less effective in separating the $C_{14}$ compounds.

The separatory properties of these media are optimized by varying the ratio of metal reagent to alkyl-thiol-silica gel. The oxidation states and valence electrons affect the binding of the metal reagent to alkyl-sulfur-silica gel, and to the alkyl-thiol-metal-silica gel medium to the organic compounds. A plurality of alkyl-sulfur-metal-silica gel media having different ratios of each of two or more metals reacted with alkyl-sulfur-silica gel are accordingly prepared and examined for their chromatographic separation properties.

The alkyl-thiol-copper silica gels were observed to be effective in separating organic compounds specifically separating saturated and mono-unsaturated and multi-unsaturated organic compounds. It is envisioned that gold and platinum chromatographic media would be even more effective than silver, however less economical to prepare. Subsequent Examples herein used the alkyl-thiol-silver silica gel to separate organic compounds.

Example 10

Figure 11:
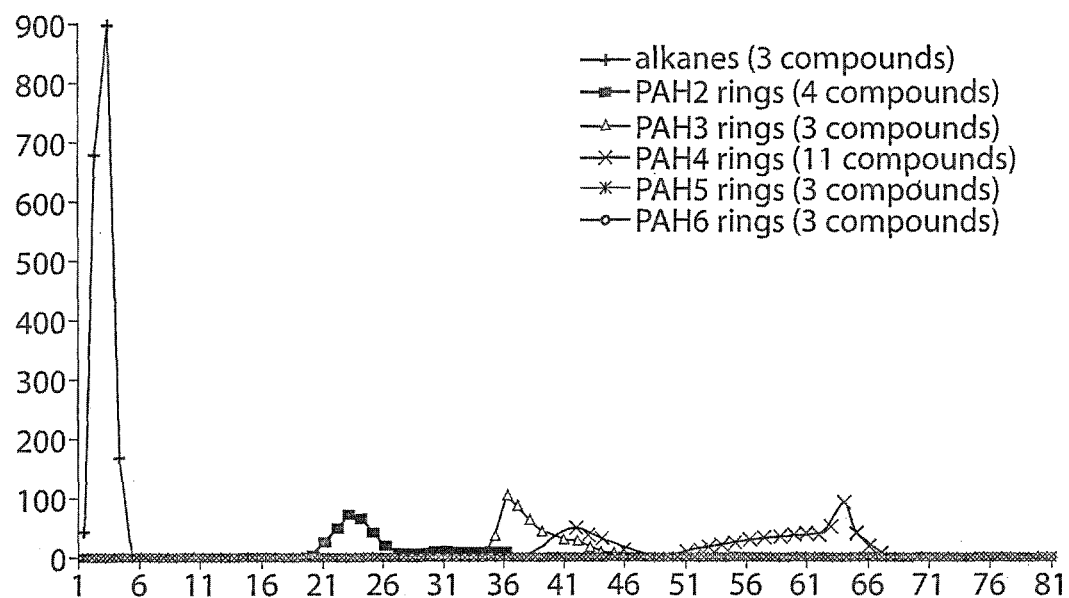
FIG. 11 is a trace showing data obtained from chromatographic separation of a mixture of 27 commercially available polyaromatic hydrocarbons (PAHs) using a silver thiolate silica gel pipette column. The data show that the thiol-silver-silica gel pipette column effectively separated the alkanes (diamonds), PAHs containing two rings (four compounds; squares), PAHs containing three rings (three compounds; triangles), and the PAHs containing four rings (11 compounds, -x-).

Separation of Organic Molecules Including Each of Polyaromatic Hydrocarbons and Alkenones Using Thiol-silver Pipette Columns Separation of alkanes, polyaromatic hydrocarbons (PAHs), and alkenones were investigated using alkyl-thiol-silver silica gel. A pipette column loaded with thiol-silver silica gel medium was prepared by methods herein. Data show that the thiol-silver silica gel effectively separated alkanes from PAHs, the alkanes observed to elute first, then the PAHs eluting in order of the number of rings (FIG. 11). Specifically the PAHs eluted in the following order: PAHs having two rings, PAH having three rings, and PAHs having four rings.

The PAHs having five rings or six rings were not observed. These compounds are very electronegatively rich, as they have multiple numbers of carbon-carbon double bonds. As the silver atom has strong affinity and specificity to electronegatively rich species such as carbon-carbon double bonds, the thiol-silver silica gel strongly attached to these PAHs. Thus the tightly bound PAHs remained bound to the medium following elution of less electronegatively rich PAHs having fewer carbon-carbon double bonds had eluted from the columns. These data indicate that the media provided herein are useful for batch purifications of materials to separate a sample from unwanted contaminants. By loading smaller amounts of silver or diluting the silver with less effective metal (e.g., copper, Cu) or ineffective metal (e.g., nickel, $Ni^{2+}$), a column for separating PAHs can be obtained.

Separation of a mixture of tri-unsaturated, tetra-unsaturated $C_{37}$ and $C_{38}$ alkenones using thiol-silver pipette columns was observed (FIG. 12). Unsaturated alkenones were significantly separated using the alkyl-sulfur-silver silica gel, the di-unsaturated $C_{37}$ alkenones appeared in separate distinct peaks from each of the tri-unsaturated $C_{37}$ alkenones and the tetra-unsaturated $C_{37}$ alkenones. Overlapping peaks were observed for individual $C_{37}$ and $C_{38}$ alkenones and a similar pattern in peak elution was observed for the alkenones compared to PAHs. Specifically the more electronegatively rich alkenones (i.e., alkenones having a higher relative degree of unsaturation) were eluted later than the less electronegatively rich alkenones (i.e., alkenones having lower relative degree of unsaturation). These data show that the alkyl-sulfur-silver silica gel medium prepared as a pipette was sufficient for analytical purposes, and that a larger column would yield total separation and purification of these compounds.

Examples 11

Figure 13:
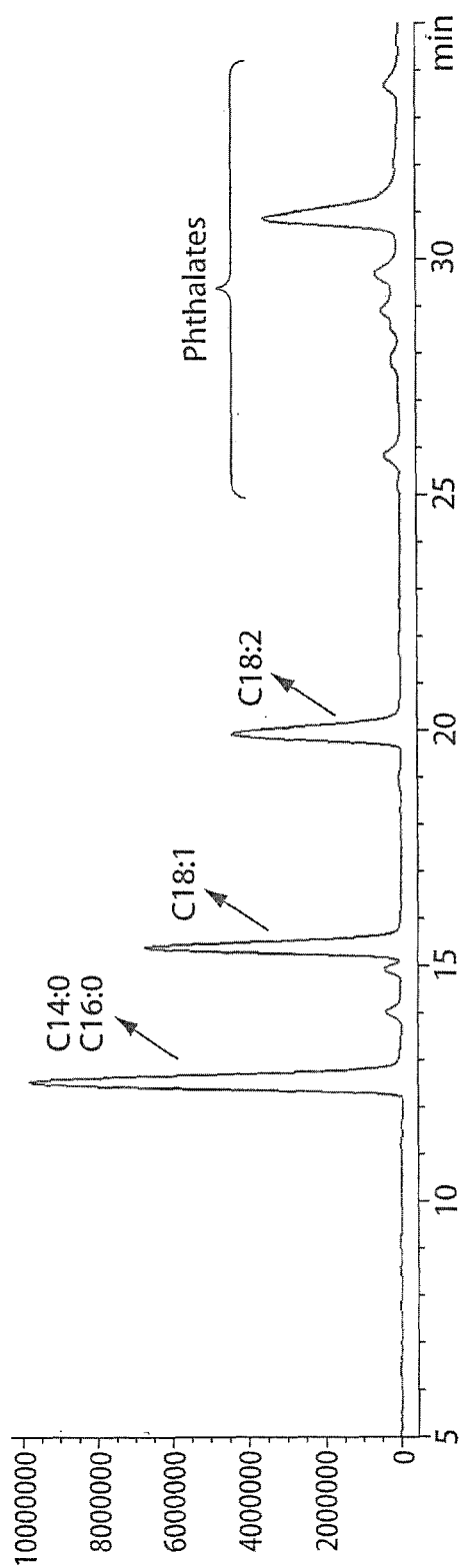
FIG. 13 is a trace of HPLC data of separation of a mixture using a silver thiolate HPLC column of the following commercially available compounds, in order of elution: saturated triglycerides, mono- unsaturated triglycerides, di-unsaturated triglycerides and phthalates. Data show that the thiol-silver HPLC column effectively separated the saturated $C_{14}$ triglycerides (C14:0; left peak) and the saturated $C_{16}$ triglycerides (C16:0), the $C_{18}$ mono-unsaturated triglycerides (C18:1; second peak from the left) and the $C_{18}$ di-unsaturated triglycerides (C18:2; third peak from the left) from the phthalates (right peaks).

Separation of Triglycerides, Sterols, Alkenones and Alkenes with Alkyl-sulfur-silver HPLC Columns Triglycerides, sterols, alkenones, and alkenes were separated using the alkyl-sulfur-silver silica gel and HPLC. The thiol-silver silica gel medium separated and identified triglycerides $C_{14}$ and $C_{16}$ unsaturated triglycerides, $C_{18}$ mono-unsaturated triglycerides and $C_{18}$ di-unsaturated triglycerides, and separated these compounds completely from phthalates (FIG. 13). Since phthalates present as plasticizers have been widely found as environmental contaminants, these data show that this medium is useful as an environmental analytical tool, to assay extent of contamination.

Figure 14:
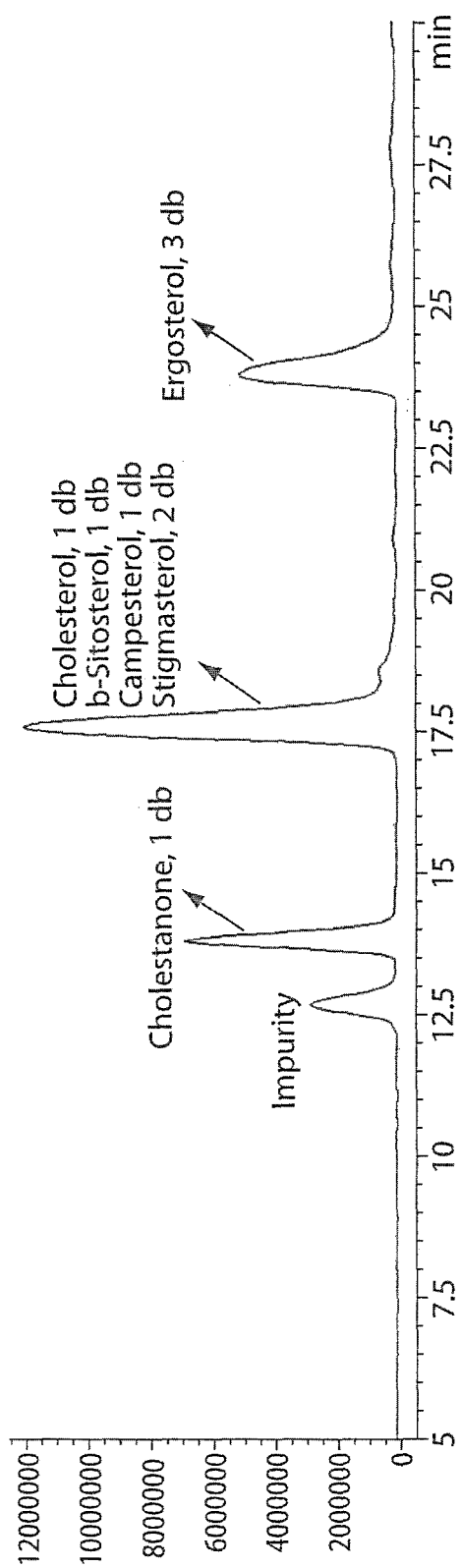
FIG. 14 is a trace showing the HPLC data for separation using a silver thiolate HPLC column of sterols from impurities in a biological sample. Data show that the silver thiolate HPLC column and system effectively separated each of mono-unsaturated cholestanone (second peak from the left); a mixture containing mono- and di-unsaturated sterols, cholesterol, β-sitosterol, campesterol, and stigmasterol (third peak from the left); and tri-unsaturated ergosterol (right peak) from a peak considered to be an impurity (left peak).

The thiol-silver silica medium further was shown capable of separating an impurity from a mixture of the sterols cholestanone (one carbon-carbon double bond); sterols having one or two carbon-carbon double bounds including cholesterol (one carbon-carbon double bound), β-sitosterol (one carbon-carbon double bond), campesterol (one carbon-carbon double bound); and stigmasterol (one carbon-carbon double bound); and ergosterol (three carbon-carbon double bonds). See FIG. 14.

Further, the alkyl-sulfur-silver medium was observed to separate components of a mixture of tri-unsaturated $C_{37}$ and $C_{38}$ alkenones, tetra-unsaturated $C_{37}$ and $C_{38}$ alkenones (FIG. 15), and a mixture of $C_{14}$ alkanes and tetra-unsaturated $C_{14}$ alkenones (FIG. 16).

Thus, the chromatographic media herein were observed to be effective in separating a wide range of molecules, including saturated and unsaturated compounds having different degrees of unsaturation, and aliphatic saturated and unsaturated compounds having different carbon lengths. Thus, the media were effective in separating molecules in a high pressure system such as HPLC and using the pipette column systems at ambient pressure.

Example 12

Preparation of Sediment Samples and Algal Cultures Containing Alkenones

Sediment samples to be tested for hydrogen isotopes are obtained and prepared for testing. The samples are homogenized using a mortar and pestle. An amount of each sediment (0.5 g-1.5 g) sample is obtained and the organic compounds contained in the sample are extracted using dichloromethane. The extracted samples are separated into acid and neutral fractions using Supelco Supelclean LC-NH$_2$ solid phase extraction tubes. The neutral fractions are removed and are added to a column containing alkyl-sulfur-silver silica gel material as prepared by methods in Examples herein. Elution buffer is added and separated fractions are collected. The fractions include a sequential set that contains aliphatic hydrocarbons, a set that contains ketones, and a set that contains alcohols.

Cultures of *Emiliana huxleyi* (CCMP374), a species of coccolithophore alga that produces alkenone compounds, are obtained. The cultures are grown at 20° C. in f/2 medium using seawater from West Boothbay Harbor, Me., and are harvested during log-phase growth.

One liter of medium is filtered using pre-combusted Whatman GF/F glass fiber filters, a porosity 0.7 micron. The alkenones are extracted from the filters by soaking once in methanol and twice in dichloromethane.

Example 13

Separation of Alkenones Using Alkyl-sulfur-silver Silica Gel

The alkenones from the sediment samples and algal cultures are separated using the alkyl-sulfur-silver silica gel described herein, and analyzed for compound-specific hydrogen isotopes.

The alkyl-sulfur-silver silica gels are rinsed with four bed volumes of dichloromethane. Gels are kept saturated in dichloromethane until use. Samples are added to the each column and are eluted, and fractions are collected for each sample column.

The fractions containing ketones and a control (n-heptatriacontane) are quantified using gas chromatography-flame ionization detection (GC-FID). Hydrogen isotopic analysis is performed on the samples using a Hewlett-Packard 6840+ GC-pyrolysis system interfaced to a Finnigan Delta+XL stable isotope mass spectrometer through a high temperature pyrolysis reactor.

Analysis of the samples shows that the sediments samples are separated using the column containing the alkyl-sulfur-silver silica gel. Data show that the gels and methods described herein effectively separate the long chain $C_{37}$, $C_{38}$ and $C_{39}$ alkenones contained within the sediment samples and algal culture. The methods and materials described herein are effective in chromatographically separating di-unsaturated alkenones and tri-unsaturated alkenones present in the samples. Isotope ratios of the alkenones are analyzed and data show a correlation between the types of alkenones, the identity of algal samples, and the source water utilized by the algal samples during biosynthesis.

Analysis shows that the individual alkenones contain different isotopic compositions, which provides insight into pathways of biosynthesis of alkenones and phylogeny of algae.

Example 14

Chemical Reactions for Preparing Silver-based MTCM

A variety of synthetic methods are shown for preparing silver-based MTCM having improved loading capacity for silver metal and overall retention capacity of the MTCM.

Figure 17:
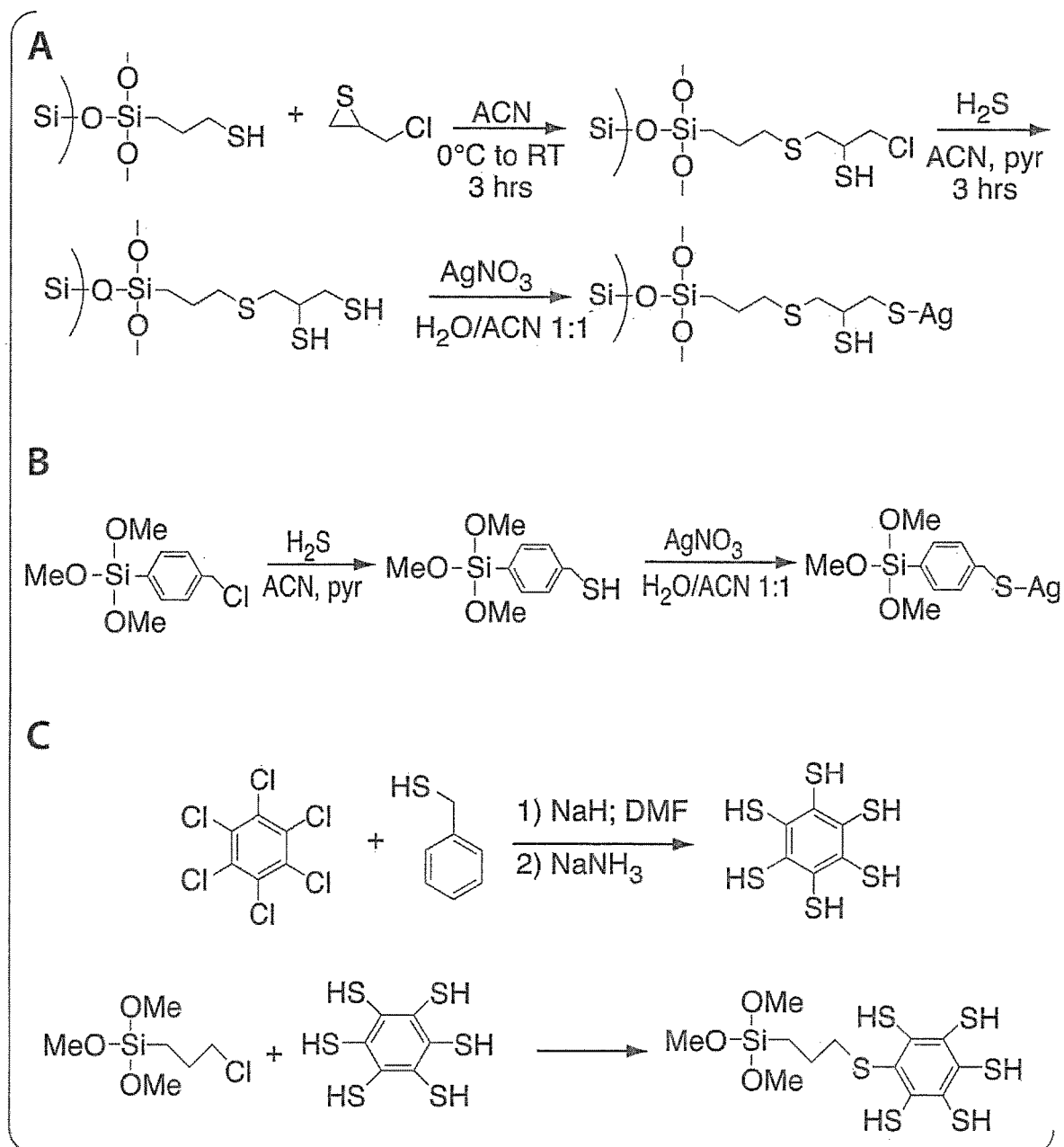
FIG. 17 is a set of drawings showing chemical reactions for preparing a silver-based MTCM with improved loading capacity of silver and retention capacity of the MTCM.

A chemical reaction for synthesizing a di-thiol is shown in FIG. 17 panel A. A thiol silica gel having a silanol group on the silica gel surface is reacted with 3-chloropropylene sulfide in acetonitrile initially at 0° C. and is then warmed to RT for three hours. The product is then reacted with sulfur hydride in acetone and pyridine for three hours to yield a di-thiol, which is then reacted with silver nitrate in a solution of water and acetonitrile (1:1) to yield a silver-based (di-thiol) MTCM.

FIG. 17 panel B shows a chemical reaction for synthesizing a silver-based MTCM having a benzyl mercaptan by reacting (trimethoxysilyl)benzyl chloride with sulfure chloride in acetonitrile and pyridine, and then adding silver nitrate in water and acetone (1:1) solution to yield a silver trimethoxysilyl)benzyl compound that is a substituted benzyl mercaptan.

A chemical reaction is shown also for synthesizing a benzene hexathiol compound (FIG. 17 panel C). Hexachlorobenzene and benzylmercaptan (both commercially available from Sigma Aldrich Inc.) are reacted in dimethylformamide and sodium hydride to yield benzene hexathiol (FIG. 17 panel C top). See also Richer et. al. 1989 Zeitschrift fuer Chemie, 29(12): 444. The benzene hexathiol is reacted with mercatopropylsilane to yield a benzene hexathiol substituted-mercatopropylsilane (FIG. 17 panel C bottom), which is then reacted with silver nitrate to form the silver-based MTCM.

Without being limited by any particular theory or mechanism of action, it is here envisioned that these chemical reactions produce media having greater stability and capacity for thiol atoms to covalently bind silver atoms and thus to improve capacity of the resulting silver-based MTCM.

Example 15

Stability of Silver-based MTCM

To determine whether silver-MTCMs are stable and do not lose substantial amounts of silver, HPLC columns containing the medium were prepared and washed with different polar and non-polar solvents: hexane, ethyl acetate, acetone, methanol, and acetonitrile. Data show that the amount of silver that leached out of the HPLC column prepared with silver-based MTCM was negligibly small irrespective of the polarity of the solvent used (Table 1). Acetonitrile resulted in the greatest amount of silver leaching (4.46 parts per million, ppm) compared to methanol (18.94 parts per billion, ppb), acetone (2.28 ppb), ethyl acetate (1.12 ppb) and hexane (none detected). Most important, these detected levels are considered to be at levels below an amount that would negatively affect mass spectrometers and other detecting devices. Thus, HPLC columns prepared using silver-based MTCM were assessed to be reliable and reusable and were safe to connect to a mass spectrometer.

TABLE 1

Amount of silver leached from silver MTCM using solvents

| Solvent | Amount of leached silver detected |
|---|---|
| hexane | none detected |
| ethyl acetate | 1.12 ppb |
| acetone | 2.28 ppb |
| methanol | 18.94 ppb |
| acetonitrile | 4.46 ppm |

To assess the extent of improved stability of the silver MTCM in comparison to commercially available media, washes (i.e., parallel flushing) using different solvents were obtained from a commercially available 10% AgNO3 SiO$_2$ medium and from silver-based MTCM (AgTCM) described herein, and amounts of silver ion leached from were determined (Table 2, values in ppm). The organic solvents used were acetone, dichloromethane (DCM), and hexane. Acetone washing resulted in 21.025-fold more silver leached from impregnated silver nitrate silica gel than the silver-based MTCM. Thus, the silver-based MTCM was clearly more stable than silver nitrate impregnated silica gel column.

TABLE 2

Silver washed from silver MTCM and silver impregnated silica gel by organic solvents

| Solvent | Impregnated SiO$_2$ | AgTCM |
|---|---|---|
| Hexane | ND$^a$ | ND$^a$ |
| DCM | 0.03 | ND$^a$ |
| Acetone | 2523 | 0.12 |

$^a$None detected.

Example 16

Methods for Preparing End-capped MTCM

It was observed that in certain embodiments of silver-based MTCM described herein, the component propyl thiols do not cover the entire silica gel surface, and significant amounts of silanol functional group functionality and surface area remained unused on the surface of silica gel. In the normal phase separation, the presence of silanol groups were useful and enhanced the separation because the polar silanol groups reacted with compounds having double bonds (compounds with greater number of double bonds are slightly more polar). However, in the reversed phase separations using aqueous solutions, the presence of silanol provided an adverse effect because the polar silanol groups interfere with the non-polar stationary phase.

Figure 18:
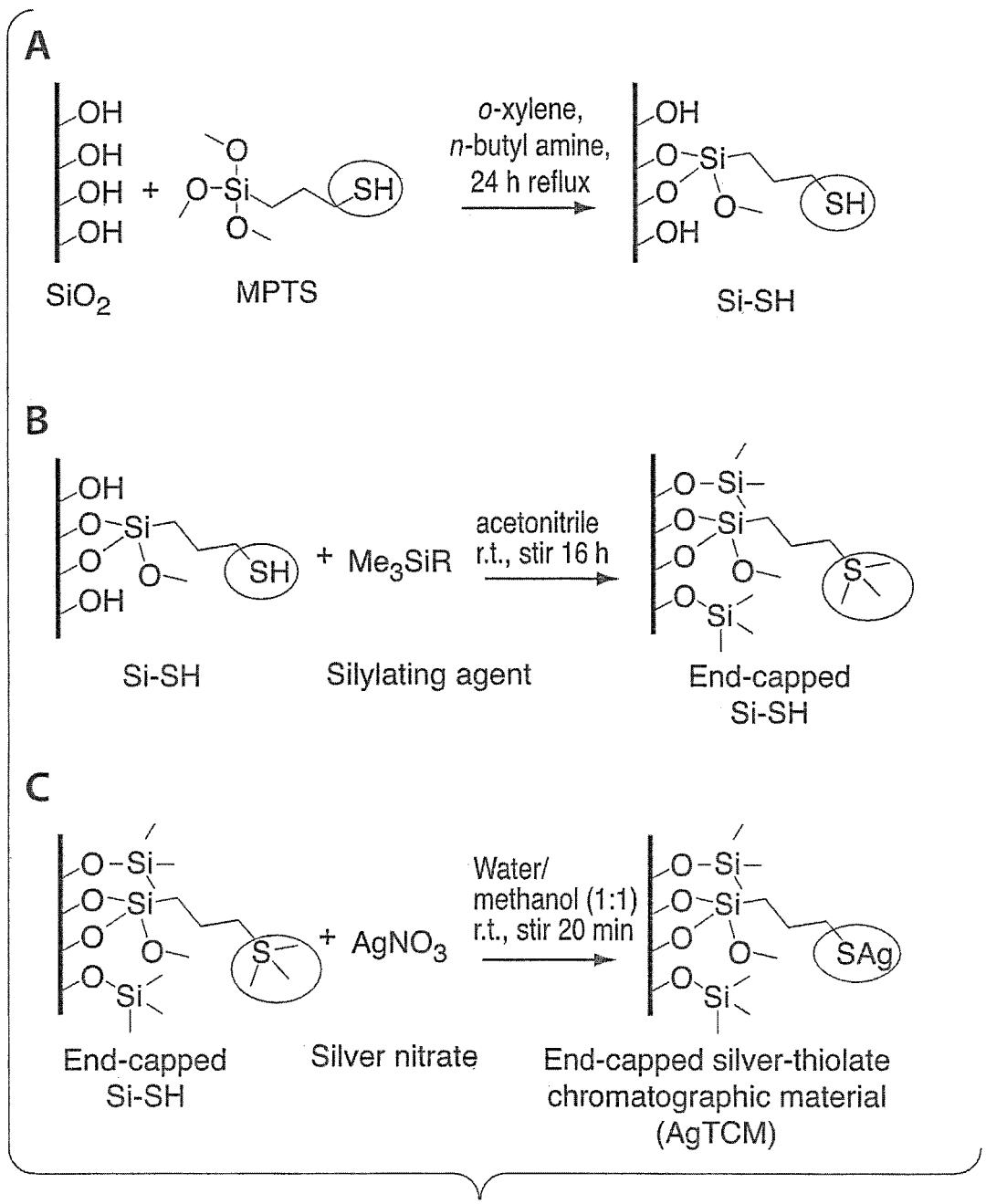
FIG. 18 is a set of drawings of chemical reactions for synthesizing an end-capped silver-based MTCM.

Examples herein show methods for effectively endedcapping the silanol groups on the silica gel (FIG. 18). In one embodiment, a silica gel is reacted for 24 hours with MIPTS in o-xylene, n-butyl amine, and refluxed with stirring to form a resulting solid that is a thiol silica gel with two silanol groups (FIG. 18 panel A). The thiol silica produced was then reacted with a silyalating agent ($Me_3SiR$) in acetonitrile at RT with stirring for 16 hours to yield a end-capped thiol silica gel (FIG. 18 panel B), which is then reacted with silver nitrate in a water/methanol solution (1:1) at RT with stirring for 20 minutes to yield an end-capped AgTCM (FIG. 18 panel C). The end-capped silver based MTCM shown herein was useful for separating molecules using reversed phased HPLC and other types of chromatographic techniques.

Example 17

Separation of Low Molecular Weight Compounds in Gas Phase Using AgTCM

Separating gaseous alkanes and alkenes (e.g., separating ethane from ethylene) is a major step in refining fossil fuels in the petrochemical industry and is performed by fractional cryo-distillation, a process involving condensing these gaseous molecules into liquid phase. Performing this distillation process requires a large amount of energy. Alternative commercial processes involve using copper salts in a slurry with variable temperature and pressure to selectively absorb and release the alkenes. The copper salt-based approach reduces the amount of energy previously required, however the copper salt is highly unstable. Copper readily disproportionates into Cu and $Cu^{3+}$ and loses the capacity to absorb alkenes.

Figure 19:
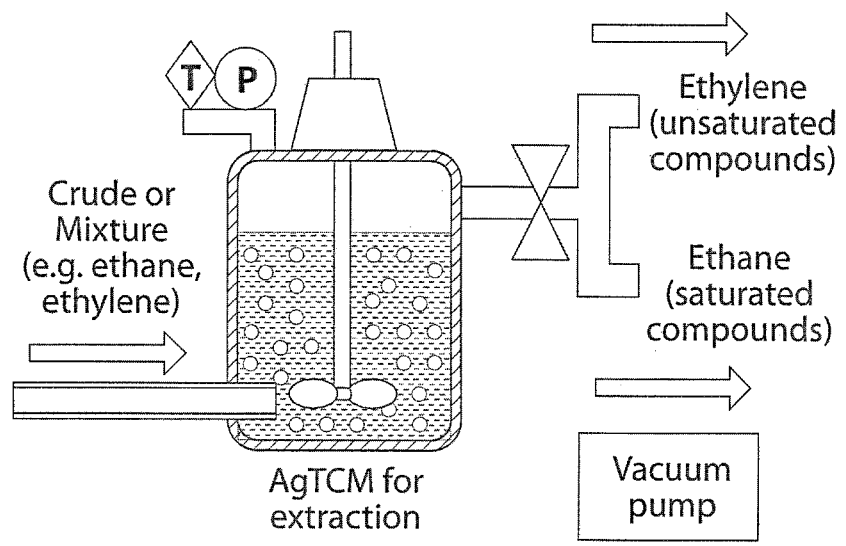
FIG. 19 is a drawing showing a system and method for separating saturated compounds (e.g. ethane) and unsaturated compounds (e.g., ethylene) from gaseous crude/mixed materials using silver-based MTCM. The drawings show a system involving directing the crude/mixed materials into a vessel containing a silver thiolate chromatographic medium (AgTCM) which specifically binds unsaturated compounds such as ethylene. The vessel is stirred and the unbound saturated compounds including ethane are removed from the vessel using a vacuum pump. The unsaturated compounds bound to AgTCM are then removed from the vessel.

Without being limited by any particular theory or mechanism of action, it is here envisioned that systems using silver-based MTCM provide stable, improved alkane/alkene processing compared to the copper salt process. An outline of an embodiment of a method and system is shown in FIG. 19. A gaseous crude material or mixture including amounts of saturated (e.g., ethane) and unsaturated (e.g., ethylene) molecules are contacted with aqueous slurry of silver based MTCM (AgTCM). The gases mixture and AgTCM are stirred to improve mixing and the silver-based MTCM selectively binds to and absorbs (extracts) the unsaturated molecules contained in the gaseous material. Saturated molecules do not bind as effective to the silver-based MTCM as the unsaturated molecules. The saturated molecules are removed from the vessel using a vacuum pump. The silver based MTCM/unsaturated molecules are kept in the vessel or are optionally moved to a separation chamber. The temperature of the vessel or the separation chamber is then increased (e.g., above 50° C.) to desorb the alkenes which are then collected and stored.

The systems, methods and compositions described herein in various embodiments show a MTSM with or without a silica gel or other substrate. Without being limited by any particular theory or mechanism of action, it is here envisioned that a simple molecule R—CH2-CH2-S—Ag, with R being —OH or other hydrophilic functional groups, is effective as a silver-based MTCM for separating saturated and unsaturated molecules. In certain embodiments, the absence of the silica gel provides greater amount of absorption capacity because greater amount of silver per unit volume is present in the system.

Example 18

Separation of Triglyercides in Oil Samples

Figure 20:
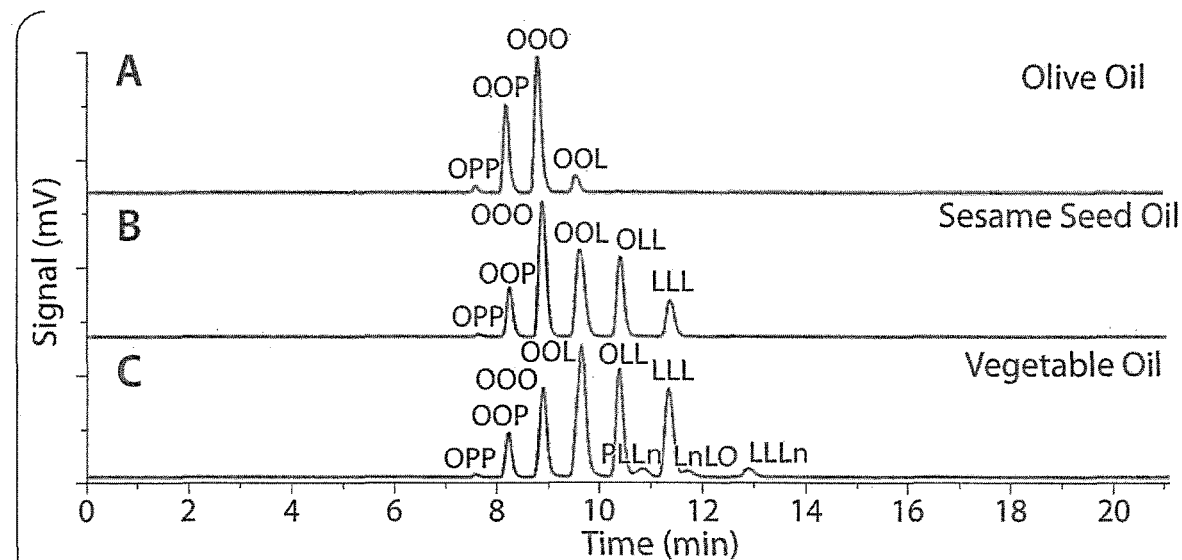
FIG. 20 is a trace showing HPLC data using silver thiolate chromatographic medium (1.5 cm length and 2.6 mm inner diameter) to separate triglycerides in commercial oil samples: olive oil, sesame oil, and vegetable oil. Data show that the HPLC columns separated triglyercides comprising fatty acids: palmitic acid (P; 16 carbons and zero carbon-carbon double bonds), oleic acid (O;18 carbons and one carbon-carbon double bond), linoleic acid (L; 18 carbons and two carbon-carbon double bonds), and linolenic acid (Ln; 18 carbons and three carbon-carbon double bonds).

To determine the ability of silver-based MTCM packed HPLC columns to separate triglycerides in commercial oil samples, a HPLC column (15 cm length and 2.6 mm inner diameter) was prepared and used to separate triglycerides having different number component fatty acids and also number of double bonds. The mobile phase used was a gradient of hexane and acetone. Methods described herein provided easy determination of the quality of the various fats without the complex chromatograms derived from reversed phase C18 column. The HPLC data was analyzed using a evaporative light scattering detector (ELSD). Data show that the columns were able to separate triglycerides from olive oil, sesame seed oil, and vegetable oil (FIG. 20). The triglycerides were composed of three fatty acids selected from: palmitic acid (P), oleic acid (O), lineolic acid (L), and linolenic acid (Ln). Triglycerides included OPP (7.5 minutes), OOP (8.2 minutes), 000 (8.8 minutes), OOL (9.7 minutes), and OLL (10.3 minutes) were identified in each of the olive oil, sesame seed oil, and vegetable oil samples. Triglyceride LLL (11.6 minutes) was identified also in the sesame seed oil sample and vegetable oil. Triglycerides PLLn, (10.4 minutes), LnLO (11.8 minutes) and LLLn (13 minutes) were also identified in the vegetable oil. Thus, silver-based MTCM effectively separated individual triglycerides from each of olive oil, sesame seed oil, and vegetable oil.

Example 19

Separation of Omega-3 Fatty Acids in Fish Oil Samples

Omega-3 fatty acids have major benefits for heart and mental health. However, the majority of commercially available omega-3 acids products are composed of about 70% unhealthy fats. Purification methods for removing the unhealthy fats include distillation and urea adduction methods that are expensive and achieve only mixed products. Methods and compositions are needed for preparing products comprising healthy 80% to 90% pure omega-3 fatty acids such as eicosapentaenoic acid (EPA) and docosahexaenoic acid (DHA).

Figure 21:
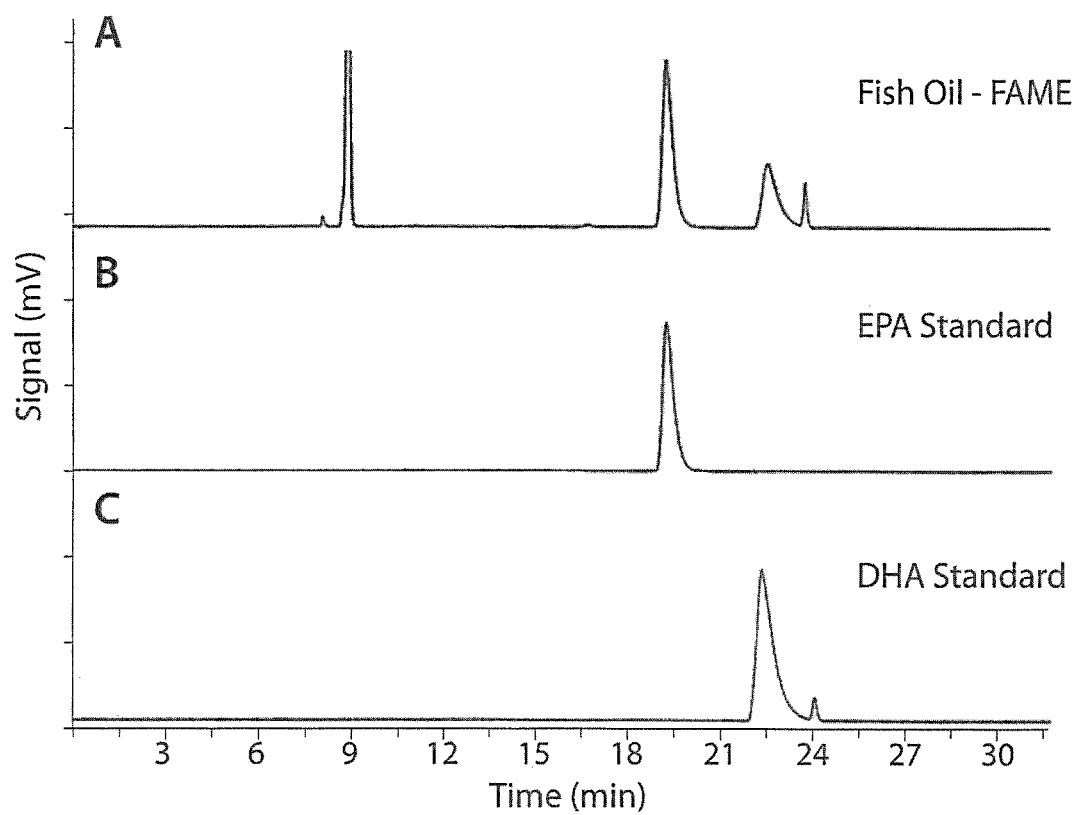
FIG. 21 is a trace showing HPLC separation using silver thiolate chromatographic medium column of omega-3 fatty acids from fish oil samples and fatty acid standard samples. The omega-3 fatty acids separated were eicosapentaenoic acid (EPA; twenty carbons and five carbon-carbon double bonds, $C_{20}$:5) and docosahexaenoic acid (DHA; twenty-two carbons and six carbon-carbon double bonds, $C_{22}$:6). Data show that the silver thiolate HPLC column effectively separated EPA and DHA from the transesterified fish oil sample, and that these omega-3 fatty acids were 100% pure and without impurities.
Figure 22:
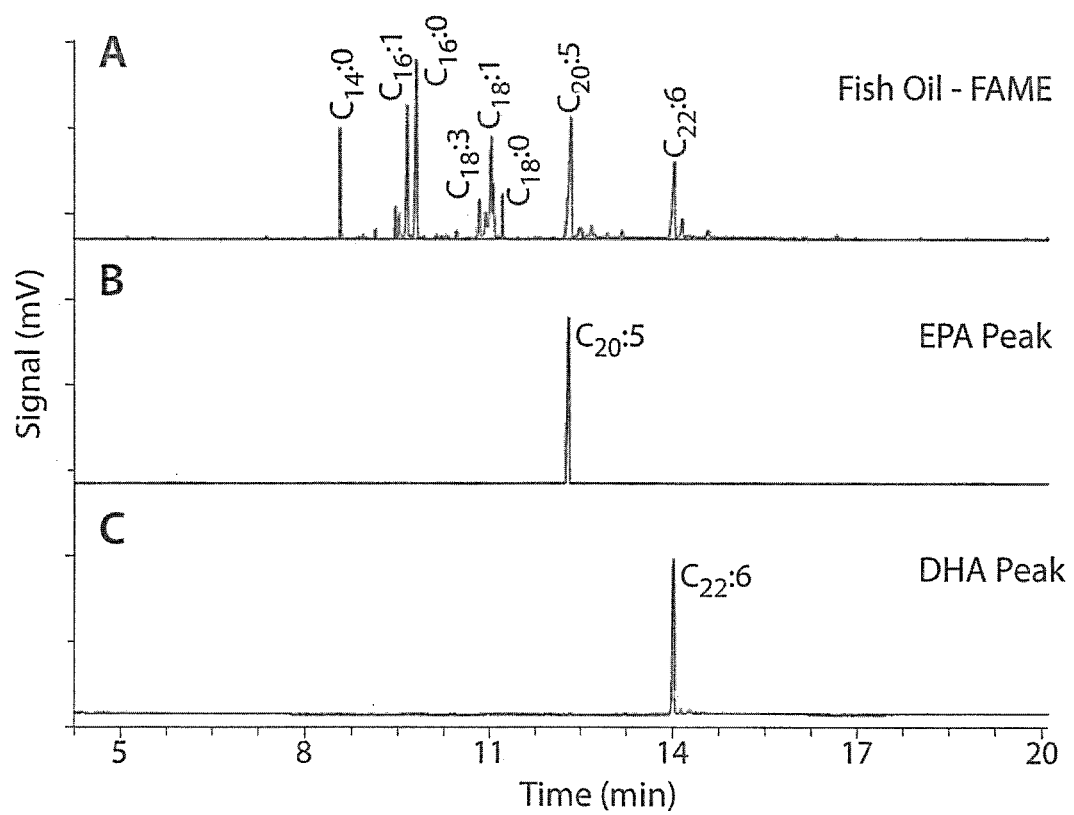
FIG. 22 is a set of traces showing the gas chromatography separations using silver-based MTCM of omega-3 fatty acids from the trans-esterified fish oil sample and standards shown in FIG. 18. Data show effective separation of EPA and DHA in the fish oil sample.

Examples herein show HPLC methods using silver-based MTCM to fully separate healthy omega-3 acids EPA and DHA from fish oil samples and standards (FIG. 21). Comparing the HPLC data for the fish oil sample to HPLC data from the EPA (20:5) and the DHA (22:6) standards show that the silver-based MTCM separation produced 100% pure EPA and DHA from the fish oil sample (compare FIG. 21 panels A-C). Gas chromatography and mass spectrometry of the fish oil sample was also performed. Mass spectrometry analysis of the EPA (20:5) and DHA (22:6) peaks from the fish oil sample showed that the MTCM effectively separated the individual omega-3 fatty acids (Compare FIG. 22 panel A to FIG. 22 panels B and C). Thus it was observed that the silver-based MTCM effectively separated the omega-3 fatty acids from the fish oil sample. Methods and compositions herein are useful for preparing greater than pure omega-3 fatty acids (e.g., EPA and DHA) products having any desired percentage of individual healthy fats.

Example 20

Separation and Identification of Triglycerides Using HPLC-MS and HPLC-ELSD

Figure 23:
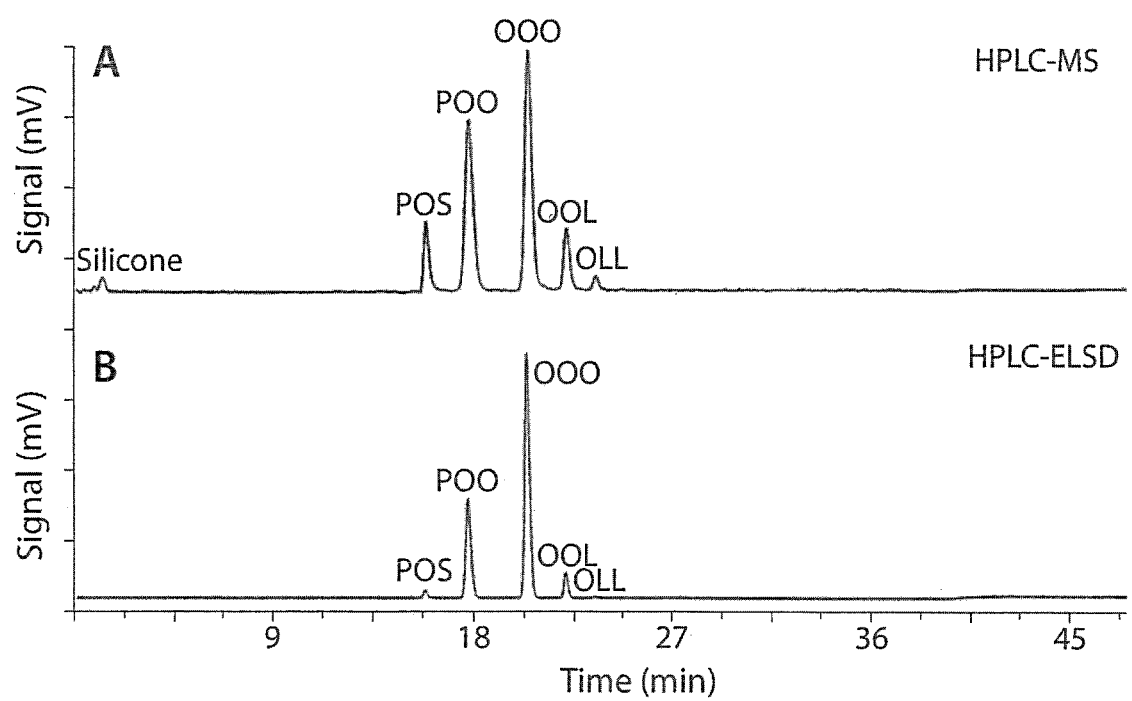
FIG. 23 is a set of traces showing separation of triglycerides from an olive oil sample using a HPLC column containing silver-based MTCM. Triglycerides (masses) were analyzed using a mass spectrometer (MS) or a evaporative light scattering detector (ELSD). The triglycerides contained palmitic acid (P), oleic acid (O), linoleic acid (L), and stearic acid (S). HPLC-MS and HPLC-ELSD analyses both showed that the silver MTCM effectively separated the triglycerides.
Figure 23:
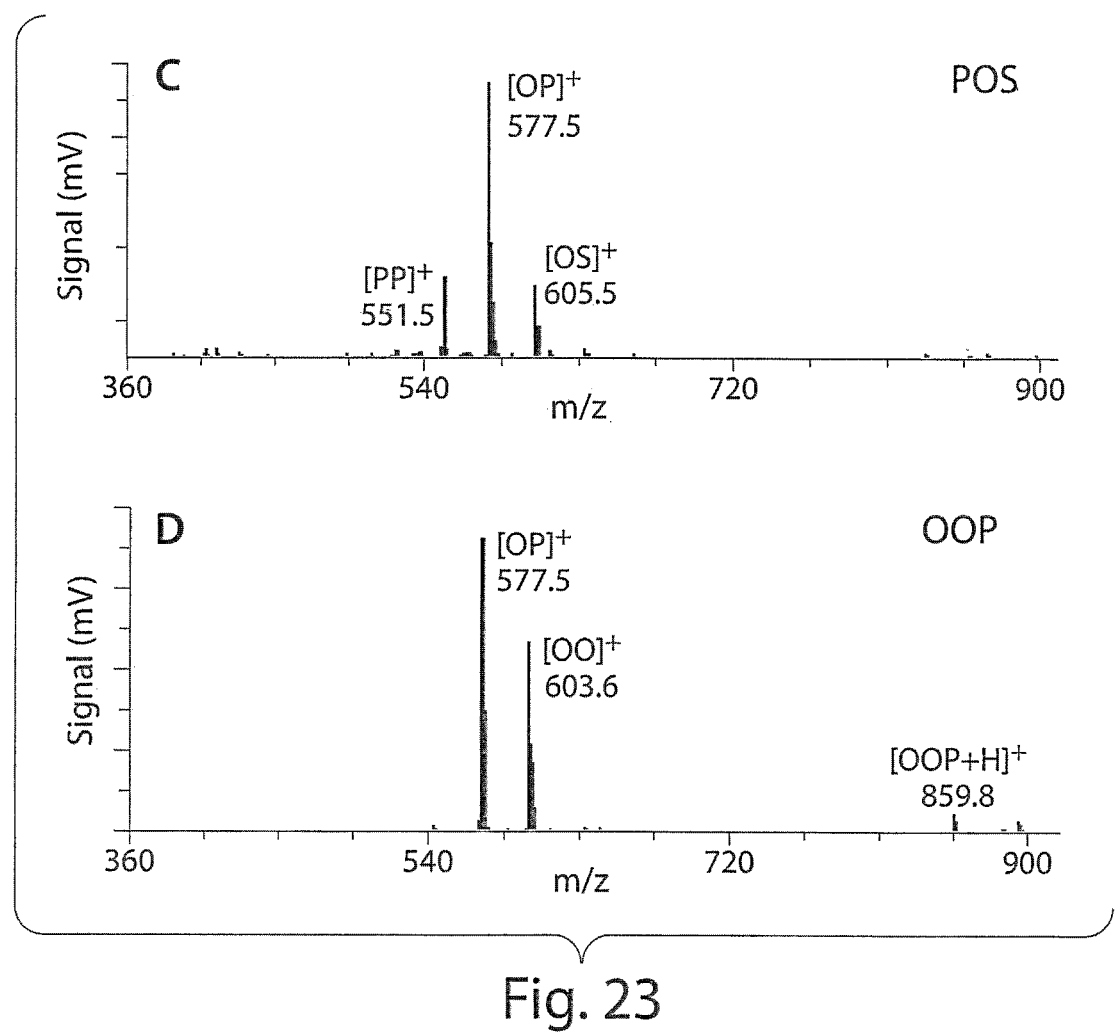
Figure 23:
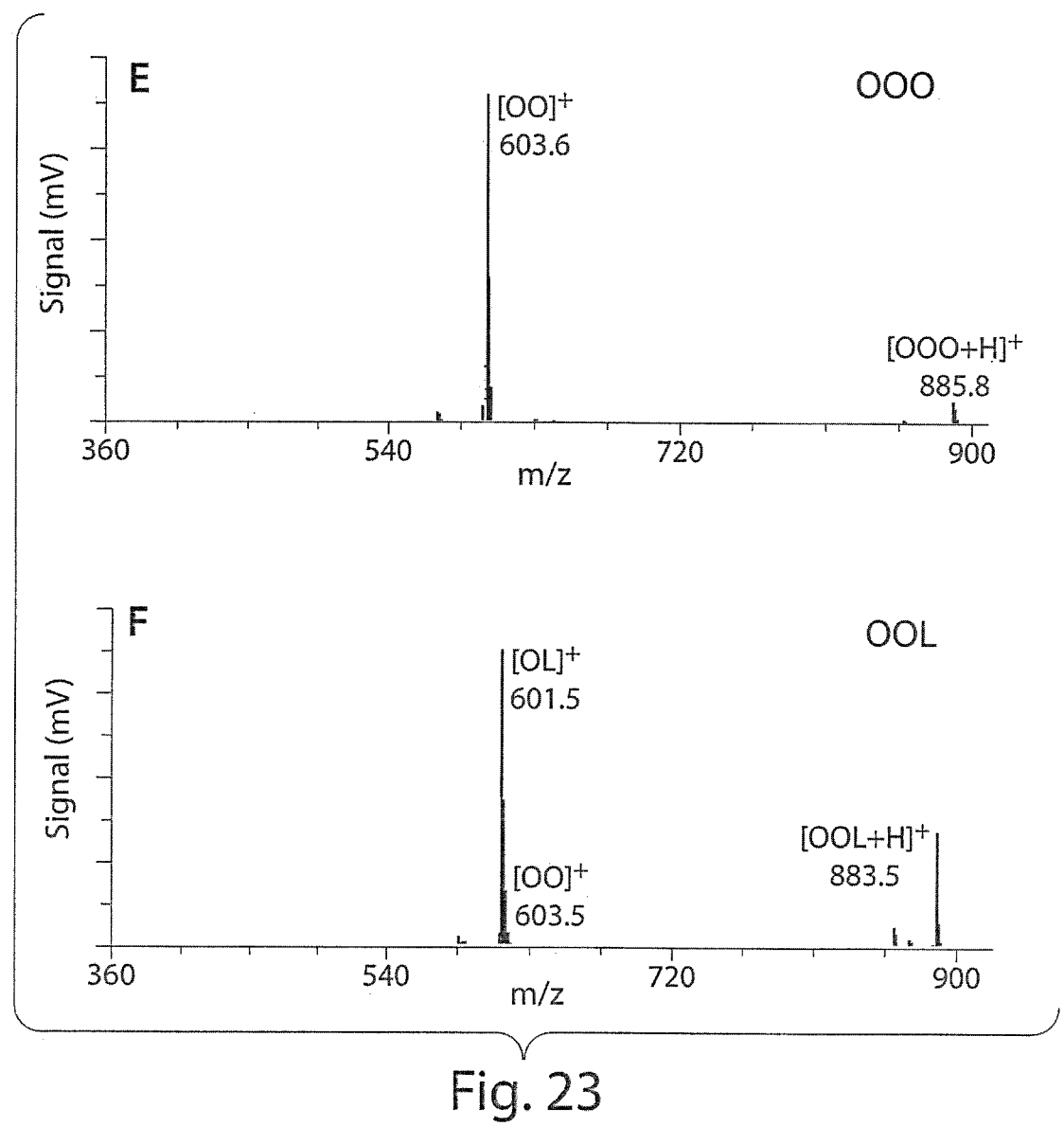

Silver-based MTCM column were used to separate and analyze triglyceride components of olive oil using HPLC and mass spectrometry, MS (FIG. 23 panel A), or evaporative light scattering detector, ELSD (FIG. 23 panel B). Both MS and ELSD analyses identified triglycerides containing different mixtures of palmitic acid (P), oleic acid (O), linoleic acid (L), or linolenic acid (Ln). Both MS analysis and ELSD analyses identified triglycerides POS, POO, OOO, OOL, and OLL. Further mass spectrometry was performed to identify the specific molecular weights of each of the triglycerides POS (FIG. 23 panel C); OOP (859.8 g/mol; FIG. 23 panel D); OOO (885.6 g/mol; FIG. 23 panel E); and OOL (883.5 g/mol; FIG. 23 panel F). Spectra obtained using the silver MTCM showed no ions containing silver related adducts, which are major impurity peaks observed using impregnated silver nitrate-based HPLC material. Data show effective separation of triglycerides using silver MTCM and both MS and ELSD analyses.

Example 21

Liquid Chromatographic Separation of Saturated and Unsatured $C_{14}$ Compounds

Figure 24:
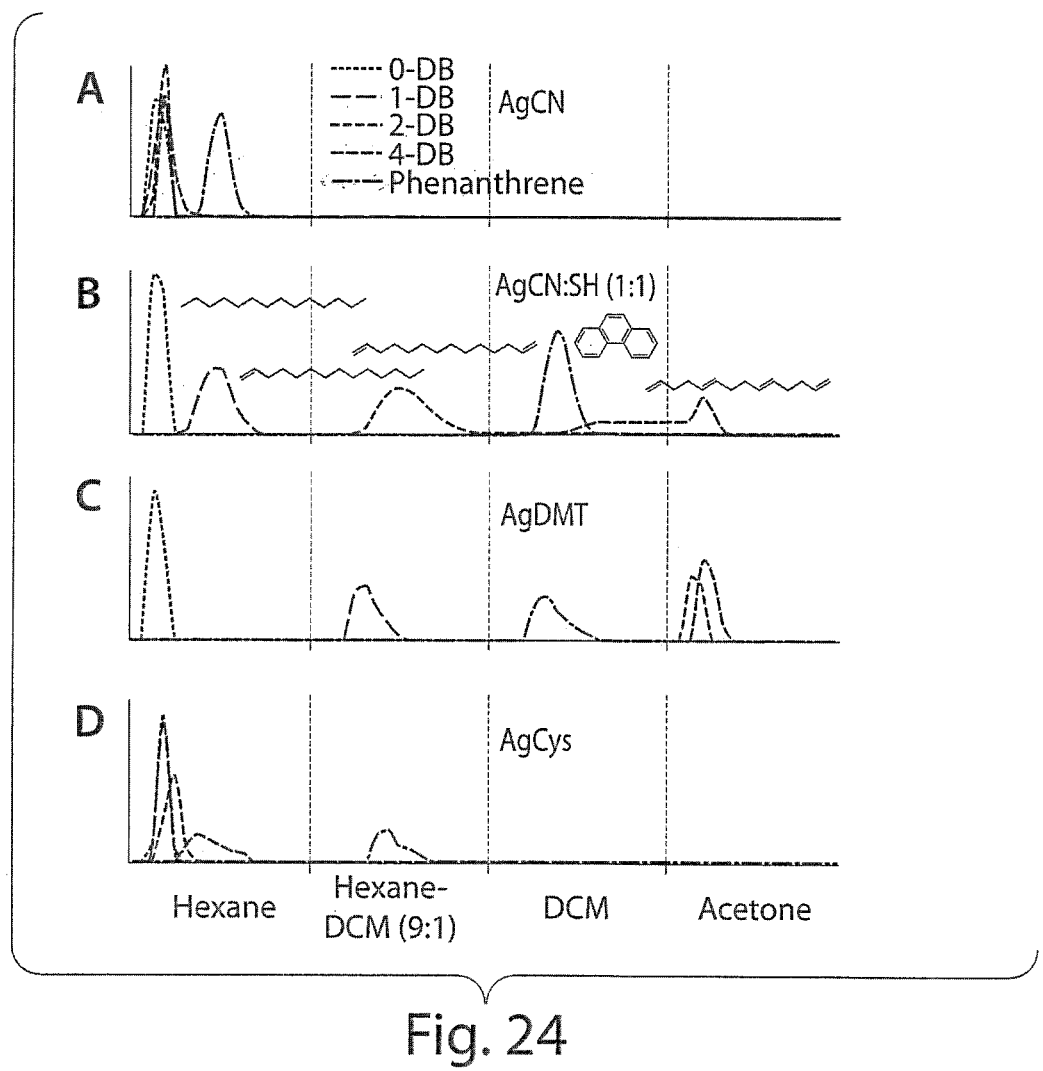
FIG. 24 is a set of liquid chromatographic separations of commercially available saturated $C_{14}$ molecules and unsaturated $C_{14}$ molecules using pipette columns containing silica gel functionalized with: cyano, cyano and thiol (1:1), dimethoxytrityl (DMT), or cysteine and reacted with silver nitrate. The 14 carbon molecules were either an aromatic compound, phrenanthrene (stars), or linear compounds that were fully saturated (diamonds) and each of mono-unsaturated (squares), di-unsaturated (triangles), and tetra-unsaturated (-x-) compounds. The compounds were eluted sequentially with hexane, hexane/dichloromethane (9:1), dichloromethane, and acetone. Data show that the cyano-thiol and DMT functionalized silver silica gels were most effective in separating the saturated and unsaturated compounds.

Liquid chromatographic separations were performed on commercially available saturated and unsaturated compounds having 14 carbon atoms ($C_{14}$) using pipette columns containing silica gel reacted with silver nitrate (i.e., silver MTCM) and functionalized with either cyano, cyano and thiol (1:1), dimethoxytrityl (DMT), or cysteine. The $C_{14}$ molecules analyzed were an aromatic compound, phrenanthrene, and linear compounds that were fully saturated, or mono-unsaturated, di-unsaturated, or tetra-unsaturated (FIG. 24). The compounds were eluted sequentially with hexane, hexane/dichloromethane (9:1), dichloromethane, and acetone. Data show improved separation of compounds using cyano-thiol functionalized silica gel (FIG. 24 panel B) and DMT functionalized silica getl (FIG. 24 panel C) compared to the cyano-functionalized silica gel (FIG. 24 panel A) and cysteine functionalized silica gel (FIG. 24 panel D). It was observed that mixing 1:1 propyl thiol and propyl cyano silica gels resulted in similar chromatographic retention although pure propyl cyano was observed to have little or no separation ability.

Example 22

Separation of Polycyclic Aromatic Hydrocarbons Using Silver MTCM

Figure 25:
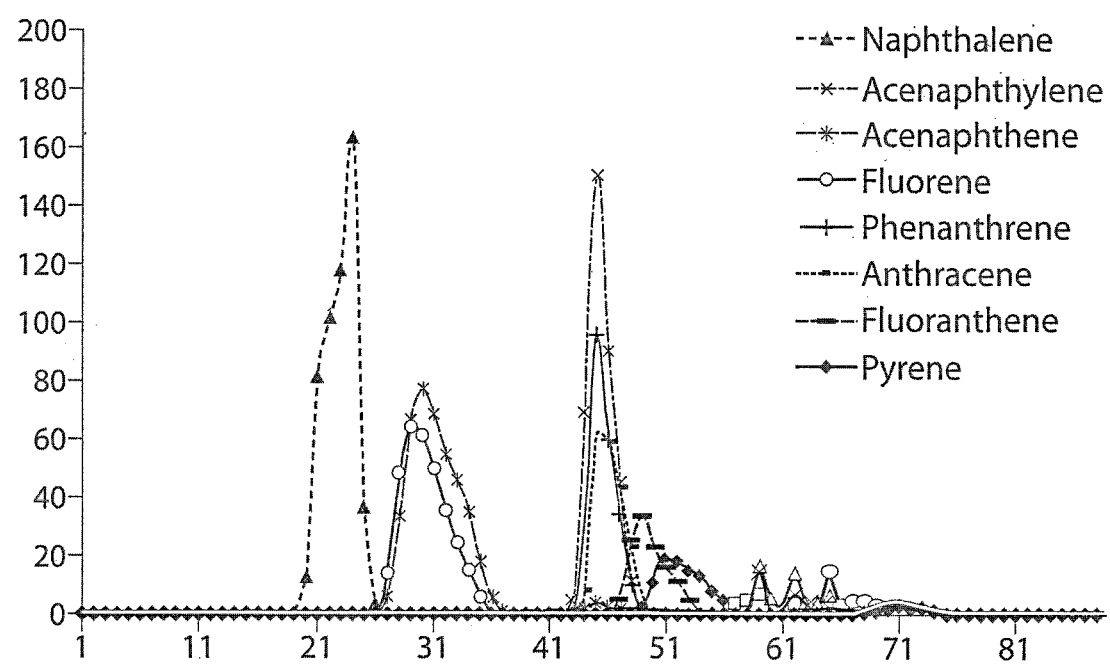
FIG. 25 is a trace showing the HPLC separation using silver-based MTCM of sterols (polyclyclic aromatic hydrocarbons): naphthalene ($C_{10}$:$H_8$; triangles); acenaphthylene ($C_{12}$:$H_8$; -x-); acenaphthene ($C_{10}$:$H_{10}$; stars); fluorene ($C_{13}$:$H_{10}$; circles); phenanthrene ($C_{14}$:$H_{10}$; vertical dash); anthracene ($C_{14}$:$H_{10}$; solid dark line); fluoranthene ($C_{16}$:$H_{10}$; solid light line); and pyrene ($C_{16}$:$H_{10}$; diamonds). Compounds were eluted sequentially with hexane, dichloromethane, acetone, and acetonitrile.

To determine the ability of silver MTCM to separate polycyclic aromatic hydrocarbonds, silver thiolate HPLC columns were contacted with sterols (FIG. 25). The sterols separated were naphthalene ($C_{10}:H_8$; seven degrees of unsaturation); acenaphthylene ($C_{12}:H_8$; eight degrees of unsaturation); acenaphthene ($C_{10}:H_{10}$, eight degrees of unsaturation); fluorene ($C_{13}:H_{10}$; nine degrees of unsaturation); phenanthrene ($C_{14}:H_{10}$; ten degrees of unsaturation); anthracene ($C_{14}:H_{10}$; ten degrees of unsaturation); fluoranthene ($C_{16}:H_{10}$; twelve degrees of unsaturation); or pyrene ($C_{16}:H_{10}$; twelve degrees of unsaturation). Thus the sterols shown herein had different numbers of carbons, degrees of unsaturation (i.e., number of carbon-carbon double bonds), and also structure. Compounds were eluted sequentially with hexane, dichloromethane, acetone, and acetonitrile (FIG. 25). Data show effective separation of polycyclic aromatic based on size, number of carbon-carbon double bonds, and structure using hydrocarbons silver MTCM.

Example 23

Separation and Purification of EPA and DHA Using Supercritical Fluid Chromatography and MTCM Supercritical fluid chromatography (SFC) using silver-based MTCM was performed to purify EPA and DHA from a fish oil sample.

SFC involves carrying a sample through a separating column using a supercritical fluid (typically carbon dioxide) where the mixture is divided into unique bands based on the amount of interaction between individual analytes and the stationary phase in the column (See Berger et al. U.S. Pat. No. 7,048,517 issued May 23, 2006; and Berger et al. U.S. Pat. No. 6,685,828 issued Feb. 3, 2004, each of which is incorporated herein by reference in its entirety). SFC has a number of advantages including reduced solvent cost and convenient product recovery because the light gases (e.g., carbon dioxide) used are volatile and easily removed at room temperature.

Figure 26:
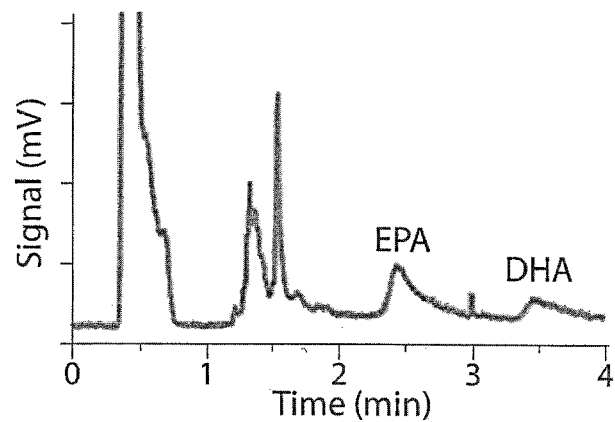
FIG. 26 is a drawing of a supercritical fluid chromatography separation using silver-based MTCM of omega-3 fatty acids EPA and DHA from a fish oil sample. Data show effective separation of EPA and DHA in the fish oil sample.

A fish oil samples was analyzed using SFC with carbon dioxide and 20% ethanol as the mobile phase and silver-based MTCM as the stationary phase. Data show that the silver-based MTCM separated EPA and DHA from other saturated or mono-, di- and tri-unsaturated fatty acid methyl esters (FIG. 26).

Example 24

TLC Separation of Fatty Acid Methyl Esters Using Silver-based MTCM

Thin-layer chromatography, TLC, using silver based MTCM (AgTCM) was used to separate fatty acid methyl esters (FAMEs) having different numbers of carbon-carbon double bonds.

TLC in various embodiments involves use of a flat, relatively thin layer of material that is either self-supporting or is coated on a glass, plastic or metal surface. A mobile phase moves through the stationary phase by capillary action, in many occasions assisted by gravity or an electric potential. Methods using TLC in various embodiments involve a small quantity of a mixture (containing a plurality of substances) that is deposited as a small spot on a TLC plate, which includes for example a thin layer of silica gel ($SiO_2$) or alumina ($Al_2O_3$) coated on a glass or plastic sheet. The plate constitutes the stationary phase. The sheet is then placed in a chamber containing a small amount of solvent, which is the mobile phase. The solvent gradually moves up the plate via capillary action, and it carries the deposited substances along with it at different rates. The result is that each substance of the deposited mixture is moved a different distance up the plate by the solvent. The substances appear as a series of spots at different locations up the plate. The retention value for an individual substance is the ratio of the distance that the substance travels to the distance that the solvent travels up the plate. TLC methods and devices are shown for example in Spangenberg et al. U.S. Pat. No. 6,485,687 issued Nov. 26, 2002; Dinh et al. U.S. Pat. No. 6,783,988 issued Aug. 31, 2004; and Markoski U.S. Pat. No. 6,264,893 issued Jul. 24, 2001, each of which is incorporated herein by reference in its entirety.

Figure 27:
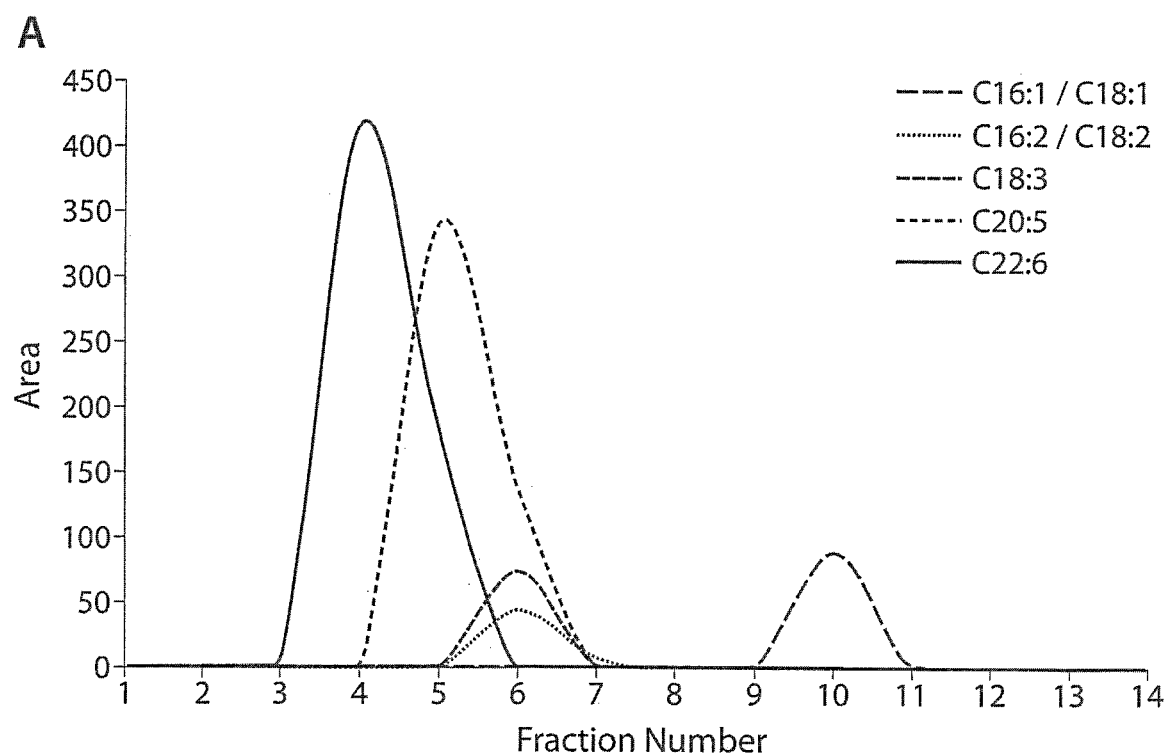
FIG. 27 is a set of drawings and a photograph showing separations of fatty acid methyl esters (FAMEs) using thin-layer chromatography (TLC) and silver-based MTCM. The FAMEs included: mono-saturated $C_{16}$ compounds (C16:1), mono-saturated $C_{18}$ compounds (C18:1), di-unsaturated $C_{16}$ compounds (C16:2), di-unsaturated $C_{18}$ compounds (C18:2), tri-unsaturated $C_{18}$ compounds (C18:3), penta-unsaturated $C_{20}$ compounds (C20:5), and hexa-unsaturated $C_{22}$ compounds (C22:6).
Figure 27:
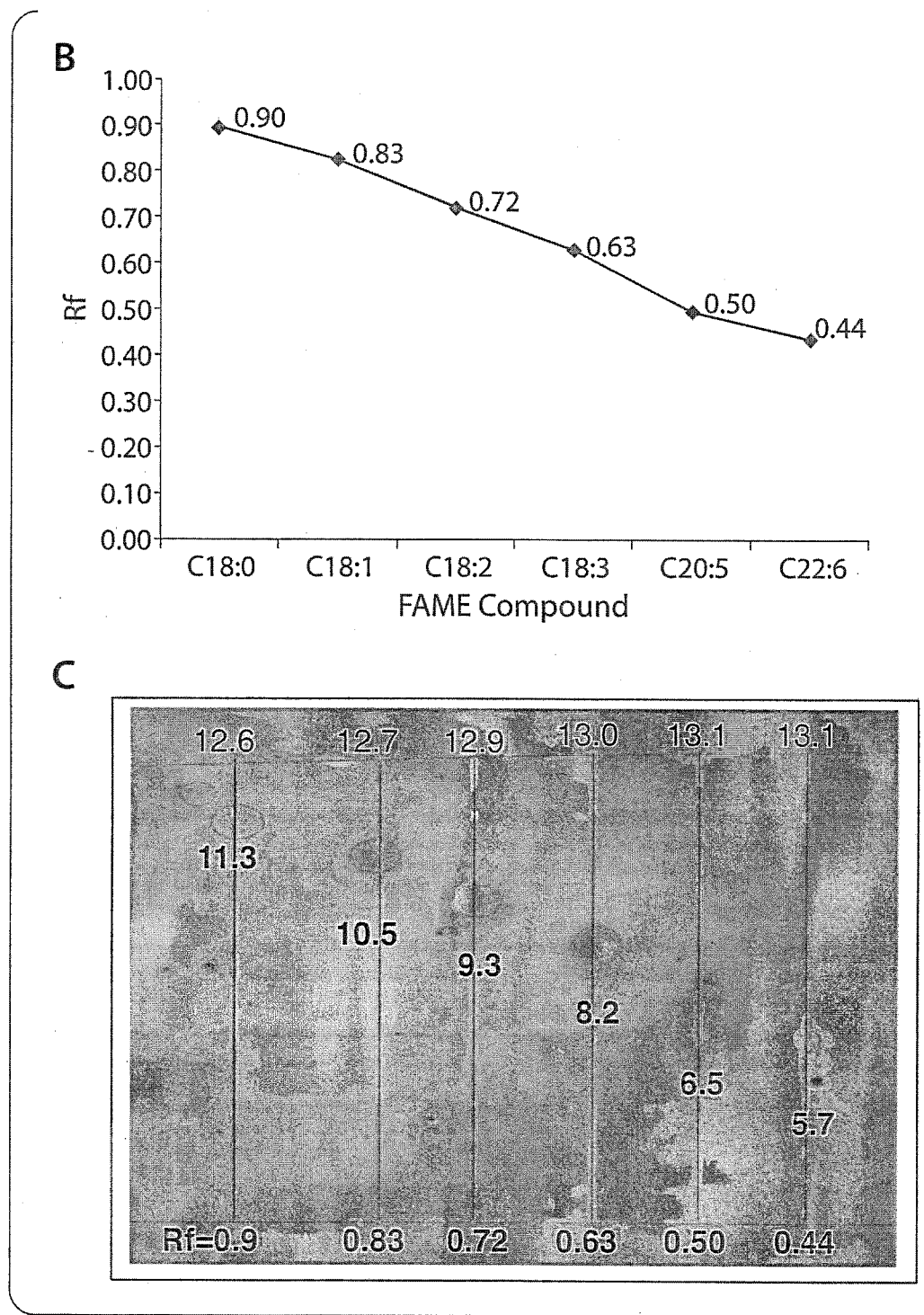

A graph showing the separation of FAMEs with different number of double bonds and having different affinity for AgTCM is shown in FIG. 27 panel A. A TLC plate was prepared that was 20 centimeters (cm) wide. The solvent used was hexane:acetone (9:1), and ten percent gypsum was used as binder. Increasing fraction number indicates a longer compound migration (fraction 1 is the start point). Partial overlapping peaks were observed. Compounds having one carbon-carbon double bond (i.e., C16:1 and C18:1 FAMEs) migrated a farther distance on the silver-based MTCM TLC plate than compounds having greater number of carbon-carbon double bonds: two (C16:2 and C18:2), three (C18:3), five (C20:5), and six (C22:6). The solvent scheme was further optimized to reduce uneven movement of peaks across the TLC plate.

Figure 28:
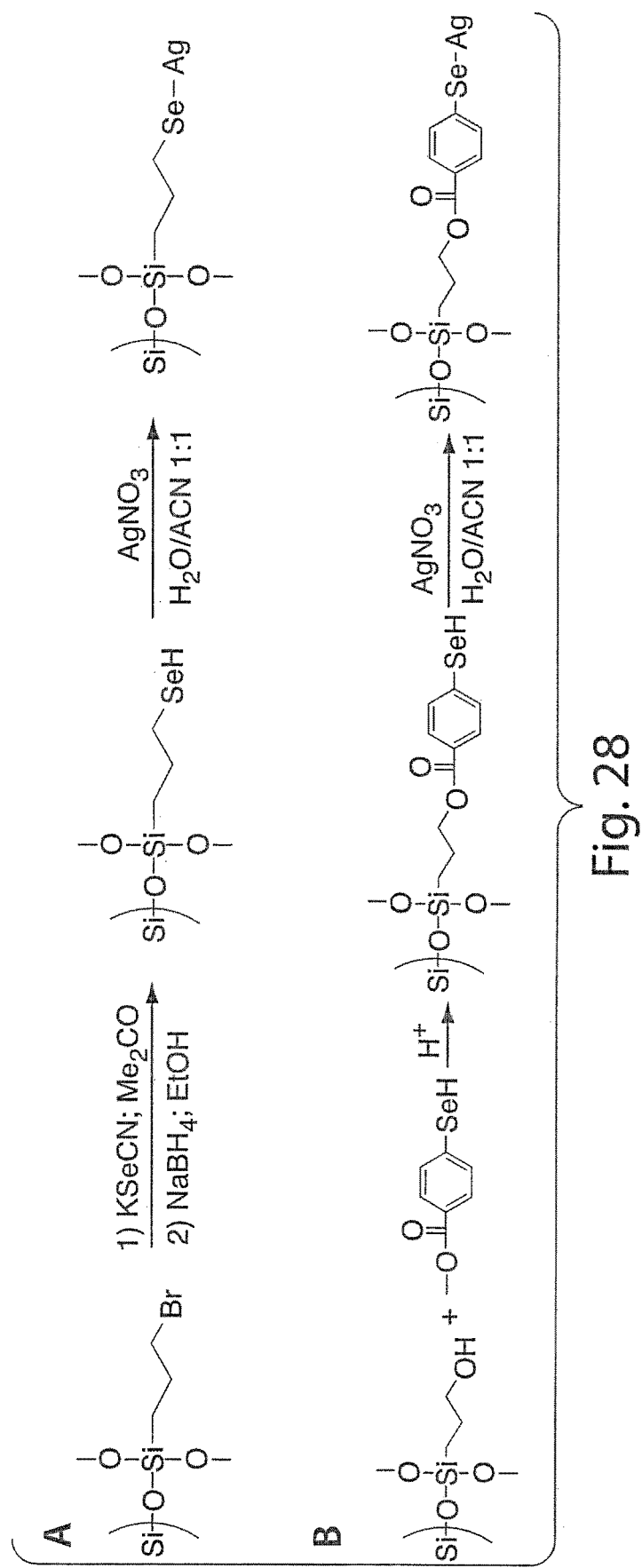
FIG. 28 is a drawing showing methods for preparing metal selenolate chromatographic media.

Additional TLC separations of FAMEs were performed using AgTCM. Retention values ($R_f$) of FAMEs with different number of double bonds are shown on AgTCM TLC (FIG. 28 panel B). The TLC plate was made with ten percent calcium sulfate ($CaSO_4$) in AgTCM in a water slurry. The TLC Plate was dried for twelve hours in a fume hood. The plate was developed with a mixture of hexane:acetone (97:3). Data show an almost a linear relationship between the number of double bonds and the $R_f$ values, which is the ratio of the distance the compound travels to the distance the solvent travels (FIG. 27 panel B). Specifically the greatest $R_f$ value was observed in C18:0 (0.90), followed by C18:1 (0.83), C18:2 (0.72), C18:3 (0.63), and C20:5 (0.50) and the smallest $R_f$ value was observed for C22:6 (0.44). Thus, $R_f$ value was a function of the degree of unsaturation and the most saturated C18:0 having no carbon-carbon double bonds had the greatest $R_f$ value, and C22:6 having the greatest degree of unsaturation (i.e., six carbon-carbon double bonds) had the smallest $R_f$ value (FIG. 27 panel B). Further, the AgTCM TLC plate was developed after staining with 6M sulfuric acid using a chromatography sprayer. FAME compounds were circled in light gray (FIG. 27 panel C). Correlating the $R_f$ value with degree of unsaturation, it was observed that the lower the $R_f$ value the greater the number of carbon-carbon double bonds and the greater the affinity of the FAME compound to the silver-based MTCM.

Example 25

Methods for Producing Metal Selenium/Selenide Chromatographic Material

To determine whether other moieties other than metal-thiolate chromatographic medium could be used to separate saturated and unsaturated molecules, selenolate silane silica gels bound to silver, copper and gold are prepared. Organoselenium compounds form a more stable complex with silver (I) than organosulfur compounds (Pettit et. al. 1967 Chem. Commun. 1179-1180). Examples herein show methods for preparing a metal organoselenium compound bound to silica surface, methods for example are shown for synthesizing a silver(I) propylselenol trimethoxysilane. In one embodiment, 3-bromopropyltrimethoxysilane is reacted with potassium selenocyanate (KSeCN) in acetone and then sodium borohydride ($NaBH_4$) in ethanol to yield a selenol silane which is then reacted with silver nitrate in water/acetonitrile (1:1) to yield a silver(1) propylselenol trimethoxysilane (FIG. 28 panel A). Alternatively, a method is shown in which 3-hydroxypropyltrimethoxysilane is reacted with a selenium benzyl ester under acidic conditions to yield a selenol silane with an aromatic ring, which is then reacted with aqueous silver nitrate in acetonitrile (H20: ACN, 1:1) to yield a silver(I) propylselenol trimethoxysilane (FIG. 28 panel B). See Kreif et al. 1985 Tetrahedron. 41(21): 4793-4812.

The reactions herein show multiple methods of preparing metal selenolate chromatographic material MSCM in addition to methods shown for preparing metal thiolate chromatographic materials. Without being limited by any particular theory or mechanism of action, it is here envisioned that systems, methods, compositions and kits using MTCM or MSCM effectively separate saturated molecules from unsaturated molecules and other electron rich molecules.

The MTCM and MSCM described herein were stable during storage at room temperature in the light and are reusable. Transition metals including gold and silver are covalently attached to each of the sulfur or selenium containing functional groups, to produce media that are economical for large-scale industrial chemical separations. Separation components including MTCM and MSCM produce accurate, reproducible and reliable separations, products and data for small-scale assays and diagnostic kits.

What is claimed is:

1. A separation system comprising:
   a silver thiolate chromatographic medium present as a stationary phase in a pipette or column, wherein the chromatographic medium comprises a sulfur-containing functional group wherein the sulfur is covalently bound to a silver atom, and
   wherein the sulfur-containing functional group is linked to a support by at least one spacer selected from: a ($C_1$-$C_{15}$)alkyl, a ($C_1$-$C_{15}$)alkoxy, a ($C_1$-$C_{15}$)heteroalkyl, a ($C_6$-$C_{10}$)aryl, a ($C_1$-$C_9$)heteroaryl, and a ($C_6$-$C_{10}$)aryl($C_1$-$C_6$)alkyl, and
   a sample source coupled to the pipette or column comprising a sample to be separated, wherein the sample includes a compound having a functional group selected from the group consisting of alkenyls, alkynyls, aromatics, and amines.

2. The chromatographic medium according to claim 1, on a support selected from the group consisting of: silica gel, alumina, polystyrene, agarose, modified polymeric resin, cellulose, magnesium silicate, dextran, and starch.

3. The chromatographic medium according to claim 1, configured as an analytical component of a chromatographic separation system selected from: normal phase chromatography, reversed-phase chromatography, liquid chromatography, planar chromatography, column chromatography, flush chromatography, flash chromatography, thin layer chromatography, high performance liquid chromatography, gas chromatography, and solid phase extraction chromatography.

* * * * *